United States Patent
Sapir et al.

(10) Patent No.: US 12,323,448 B2
(45) Date of Patent: Jun. 3, 2025

(54) SYSTEM AND METHOD FOR IDENTIFYING SECURITY THREATS BASED ON COMPLIANCE FAILURES AND INFRASTRUCTURE ACTIVITY

(71) Applicant: Dell Products L.P., Round Rock, TX (US)

(72) Inventors: Stav Sapir, Beer Sheba (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 314 days.

(21) Appl. No.: 18/304,796

(22) Filed: Apr. 21, 2023

(65) Prior Publication Data
US 2024/0356946 A1  Oct. 24, 2024

(51) Int. Cl.
*H04L 29/06* (2006.01)
*H04L 9/40* (2022.01)

(52) U.S. Cl.
CPC .......... *H04L 63/1425* (2013.01); *H04L 63/20* (2013.01)

(58) Field of Classification Search
CPC ..... H04L 63/20; H04L 63/10; H04L 63/0263; H04L 63/0227; G06F 21/70; G06F 21/50
See application file for complete search history.

(56) References Cited

U.S. PATENT DOCUMENTS

| | | | |
|---|---|---|---|
| 8,104,077 B1 * | 1/2012 | Gauvin | H04L 65/1079 726/23 |
| 8,584,247 B1 | 11/2013 | Patil | |
| 8,590,050 B2 | 11/2013 | Nagpal | |
| 8,788,442 B1 * | 7/2014 | Sculley, II | G06N 20/00 706/20 |
| 8,910,241 B2 | 12/2014 | Pollutro | |
| 10,318,628 B2 | 6/2019 | Le Bescond de Coatpont | |
| 11,184,404 B1 | 11/2021 | Hatch | |
| 11,256,777 B2 | 2/2022 | Brannon et al. | |
| 2013/0104236 A1 * | 4/2013 | Ray | H04L 63/20 726/25 |
| 2018/0176254 A1 | 6/2018 | Lam | |

(Continued)

OTHER PUBLICATIONS

"Microsoft Purview Compliance Manager," Web Page <https://learn.microsoft.com/en-us/microsoft-365/compliance/compliance-manager?view=o365-worldwide> accessed on Jan. 7, 2023.

(Continued)

*Primary Examiner* — Longbit Chai
(74) *Attorney, Agent, or Firm* — WOMBLE BOND DICKINSON (US) LLP

(57) ABSTRACT

Methods and systems for managing computing infrastructure compliance with standards are disclosed. The computing infrastructure may provide computer implemented services that may be at elevated risk if the computing infrastructure fails to comply with various standards such as security or redundancy standards. To manage compliance with standards, a cross-standard compliance coverage model may be used. The cross-standard compliance coverage model may use information regarding infrastructure components of the computing infrastructure to ascertain compliance with any number of standards. The compliance and activity of the infrastructure may be used to identify actions usable to manage the infrastructure to reduce or prevent compliance failures.

20 Claims, 16 Drawing Sheets

(56) References Cited

U.S. PATENT DOCUMENTS

| | | |
|---|---|---|
| 2018/0322510 A1 | 11/2018 | Cleaver |
| 2019/0354690 A1 | 11/2019 | Brigandi |
| 2020/0358826 A1 | 11/2020 | Helander |
| 2022/0094596 A1 | 3/2022 | Jagannathan |
| 2023/0275932 A1 | 8/2023 | Brotherson |
| 2023/0283643 A1 | 9/2023 | Manuel-Devadoss |
| 2024/0061939 A1 | 2/2024 | Pieczul |
| 2024/0311208 A1 | 9/2024 | Kandasamy |

OTHER PUBLICATIONS

"Configuration Analyzer for Microsoft Purview (CAMP)," Web Page <https://learn.microsoft.com/en-us/microsoft-365/compliance/compliance-manager-mcca?view=o365-worldwide> accessed on Jan. 7, 2023.

"GDPR Compliance Software," Web Page <https://www.solarwinds.com/access-rights-manager/use-cases/gdpr-compliance-software> accessed on Jan. 7, 2023.

"Understanding the NIST 800-53 Risk Management Framework," Web Page <https://www.apptega.com/frameworks/hist-800-53-compliance> accessed on Jan. 7, 2023.

* cited by examiner

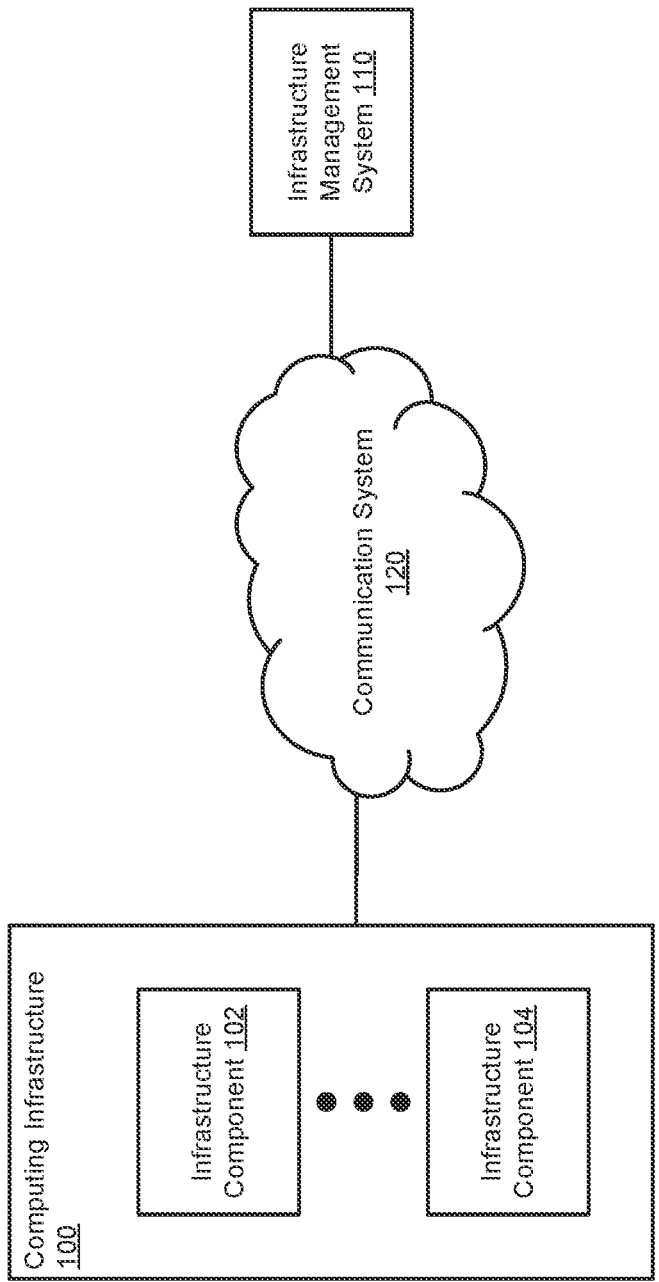

SYSTEM AND METHOD FOR IDENTIFYING SECURITY THREATS BASED ON COMPLIANCE FAILURES AND INFRASTRUCTURE ACTIVITY

FIELD

Embodiments disclosed herein relate generally to security. More particularly, embodiments disclosed herein relate to systems and methods to secure distributed systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1 shows a block diagram illustrating a system in accordance with an embodiment.

DETAILED DESCRIPTION

Figure 2A:
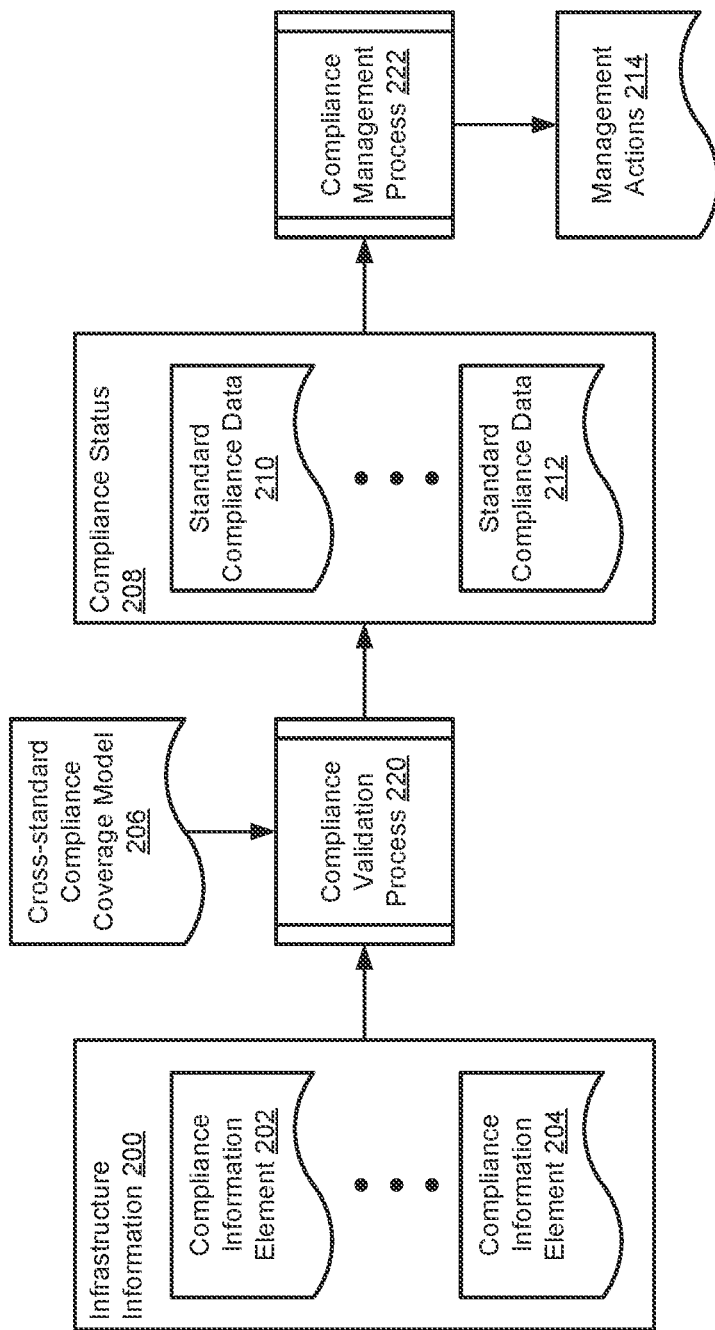
FIGS. 2A-2D show data flow diagrams illustrating data flows in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing computing infrastructure. The computing infrastructure may provide computer implemented services. Providing the computer implemented services may present risk of undesired disclosure of data and/or other undesired outcomes.

To mitigate the risks, various standards for infrastructure components of the computing infrastructure may be enforced. The standards may specify various requirements for the infrastructure components.

To manage compliance with the standards, a cross-standard compliance coverage model may be used. The cross-standard compliance coverage model may use information regarding the infrastructure components to ascertain whether the computing infrastructure meets the standards.

To obtain the information used by the cross-standard compliance coverage model, agents may be deployed and configured based on mappings included in the cross-standard compliance coverage model. The agents may monitor the infrastructure components and generate compliance information elements.

The compliance information elements may include information usable to ascertain whether the infrastructure component complies with various portions of different standards (e.g., security standards, redundancy standards, etc.). The information may be used to update the cross-standard compliance coverage model in near real time. Consequently, changes in compliance with any number of standards may be identified for computing infrastructure.

The changes in compliance may be identified at both a granular and macro level. For example, quantifications regarding compliance with different parameters of requirements of standards may be obtained. These quantifications may be used to obtain other quantifications for the standard as a whole (e.g., using averaging, weighted averages, etc.). The granular quantifications may also be used to identify actions that when performed may be likely to improve compliance with a standard. For example, parameters for which compliance is failed may be used as a basis for an action. Any number of actions may be identified for different parameters of various requirements of standards.

When changes in compliance are identified, various actions may be performed to manage the impact of the changes in compliance. The actions performed may include some or all of the identified actions. The selection process for the actions may be based on criteria that may be based on the level of compliance with the standards (e.g., lower compliance may cause more actions of the identified actions to be selected for performance, e.g., to meet goals with respect to levels of compliance with standards or portions thereof). By doing so, embodiments disclosed herein may provide computing infrastructure that is less likely to suffer from risks in providing computer implemented services.

To customize responses to compliance failure, the actions may be selected based on confidentiality-integrity-availability (CIA) classifications for different infrastructure components. The CIA classifications may allow an operator to specify the level of concern with respect to confidentiality, integrity, and availability provided by the respective infrastructure component. The operator (or an automated process) may ascribe these levels of concern based on the function of the infrastructure component, data which will be accessed by the infrastructure component, and/or other factors. In this manner, the compliance failures and CIA ratings may allow an operator of infrastructure to better understand the risk profile of their infrastructure, and initiate appropriate remedial activity to align the level of compliance with standards to these risks.

To select actions to perform to manage infrastructure components, activity of the infrastructure components may be used to identify root causes for compliance failures. Potential actions for managing the infrastructure component may be identified based on the root causes. For example, the potential actions may reverse the identified root causes, may disrupt chains of actions from the root causes and the conditions leading to the compliance failures, etc.

In an embodiment, a method for managing computing infrastructure is disclosed. The method may include obtaining a compliance information element for an infrastructure component of the computing infrastructure; dynamically processing the compliance information element to update a cross-standard compliance coverage model to obtain an updated cross-standard compliance coverage model; obtaining, using the updated cross-standard compliance coverage model, standard compliance data for a security standard enforced on the infrastructure; making a determination, based on the standard compliance data, a confidentiality-integrity-availability classifications for the infrastructure, and a rating system, whether the infrastructure has undergone a change in compliance with the security standard; in an instance of the determination where the infrastructure has undergone a change in compliance with the security standard: obtaining logs for the infrastructure component;

identifying a chain of actions leading to a compliance failure specified by the standard compliance data and that caused the change in compliance; performing an action set to manage an impact of the change in compliance with the security standard, the action set being based at least in part of the chain of actions.

The logs may specify actions performed by the infrastructure over a period of time, one of the actions causing the compliance failure.

Identifying the chain of actions may include performing first parsing of the logs to identify a first action that modified operation of the infrastructure component, the operation of the infrastructure being governed by a portion of the security standard that the compliance failures indicates that the infrastructure component fails to meet.

Identifying the chain of actions may also include performing second parsing of the logs to identify a second action on which the first action depends.

Identifying the chain of actions may additionally include performing third parsing of the logs to identify a configuration of the infrastructure component on which the first action depends.

Identifying the chain of actions may also include performing fourth parsing of the logs to identify a third action through which the configuration of the infrastructure component was modified to allow the first action to be performed.

The method may also include identifying a potential action based on one or more of the first action, the second action, and the third action; and adding the potential action to the action set.

The potential action may break the chain of actions from being repeated.

In an embodiment, a non-transitory computer readable media is provided. The non-transitory computer readable media may include instructions that when executed by a processor cause the computer-implemented method to be performed.

In an embodiment, a data processing system is provided. The data processing system may include the non-transitory media and a processor, and may initiate performance of the method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, data acquisition services, communication services, and/or any other type of service that may be implemented with a computing device.

To provide the computer implemented services, the system of FIG. 1 may include computing infrastructure 100. Computing infrastructure 100 may include any number of infrastructure components 102-104 that may provide the computer implemented services. The infrastructure components may cooperatively and/or independently provide all, or portions, of the computer implemented services.

While providing the computer implemented services, infrastructure components 102-104 may (i) be subject to interference (e.g., attacks) by malicious entities, (ii) be subject to errors in processing or other issues, etc. The interference, errors in processing, and/or other issues arising in the computer implemented services may cause the computer implemented services to diverge from nominal performance. For example, the interference by malicious entities may cause data that would otherwise remain private to be disclosed to entities that are not authorized to access the data. Similarly, errors in processing may cause some data that may otherwise be expected to be accessible in the future to become inaccessible (e.g., due to corruption, etc.).

To manage impacts of interference, errors in processing, and/or other issues, various standards for operation of computing infrastructure 100 may be established. The standards may relate to, for example, security, reliability, regulatory requirements, and/or other aspects regarding the operation and/or expectations for operation of infrastructure components 102-104.

However, the standards for operation of computing infrastructure 100 may not explicitly specify how the infrastructure components are to operate. Rather, the standards may set expectations or goals, but may also not specify how to identify whether the standards or expectations (e.g., requirements which may be multidimensional and include various parameters) are met. Further, different standards may specify the standards and/or expectations in different manners.

Additionally, failure to comply with any of the standards for any duration of time may not be acceptable. For example, the standards may specify that the standards and expectations are to be continually met.

In general, embodiments disclosed herein may provide methods, systems, and/or devices for providing computer implemented services that are more likely to be provided in manners that comply with any number of standards. The disclosed systems may provide the computer implemented services using a standards management framework. The standards management framework may measure compliance of infrastructure components used to the provide the computer implemented services with corresponding standards. If the operation of the infrastructure components diverges from the standards, then the system of FIG. 1 may take action to manage impact of the divergence of the operation of the infrastructure components from the standard.

Divergences from the standards may be characterized granularly (e.g., on a per requirement of a standard level) and at a macro level (e.g., on a per standard level). For example, quantifications (e.g., percentage levels) regarding the level of divergence may be obtained. Additionally, the divergences at the granular level may be used to identify remediation actions that when performed are likely to reduce the divergences. In this manner, both granular and macro level views of compliance, as well as options for improving compliance, may be obtained.

To ascertain how to perform remediations based on compliance failures, activity of the infrastructure components leading to the compliance failures may be identified. The activity and conditions necessary for the conditions to occur may be analyzed to identify potential actions that, when performed, may prevent similar chains of activity from being performed in the future. Any of the potential actions may be added to an action set, depending on resource availability and/or other constraints. Additionally, information regarding activities and conditions may be presented to administrators or other persons.

By doing so, a system in accordance with embodiments disclosed herein may be more likely to provide computer implemented services in a manner that meets any number of standards. The system may do so by continuously monitoring for compliance with the standards. By continuously monitoring, the resulting computer implemented services may be more likely to be nominal in performance. Thus, embodiments disclosed herein may address, among others, the technical problem of security in distributed systems. The disclosed embodiments may address security in distributed systems through dynamic analysis of compliance with any number of standards for infrastructure components that provide computer implemented services.

To provide the above noted functionality, the system of FIG. 1 may include computing infrastructure 100 and infrastructure management system 110. Each of these components is discussed below.

Computing infrastructure 100 may provide the computer implemented services. To do so, computing infrastructure 100 may include any number of infrastructure components 102-104. The infrastructure components may include objects that contribute to performance of the computer implemented services and that may be monitorable. For example, any of the infrastructure components may include hosted entities (e.g., executing programs, data structures, etc.) and/or host devices (e.g., hardware such as data processing systems) that contribute to performance of the computer implemented services.

Figure 2B:
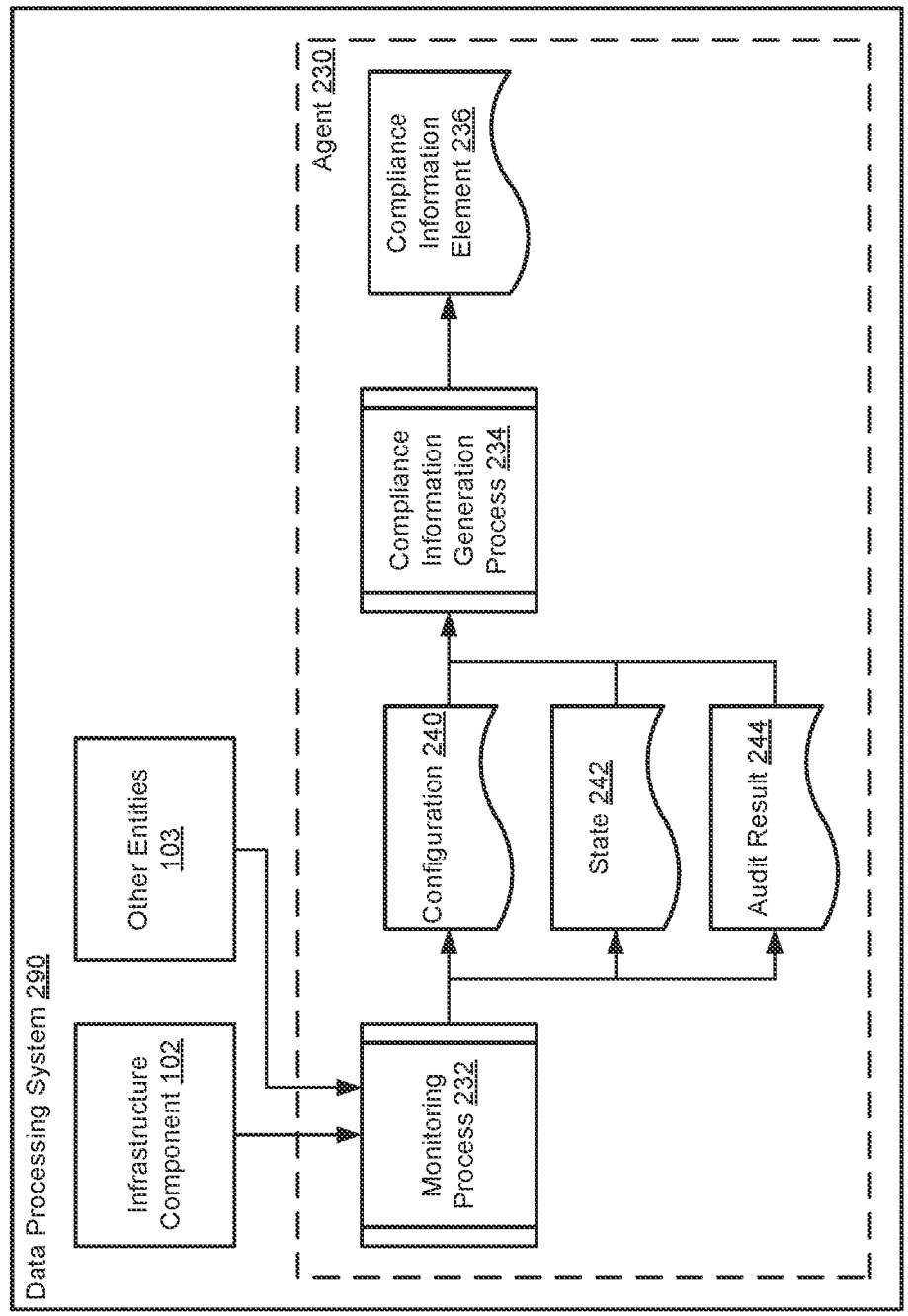
Figure 2C:
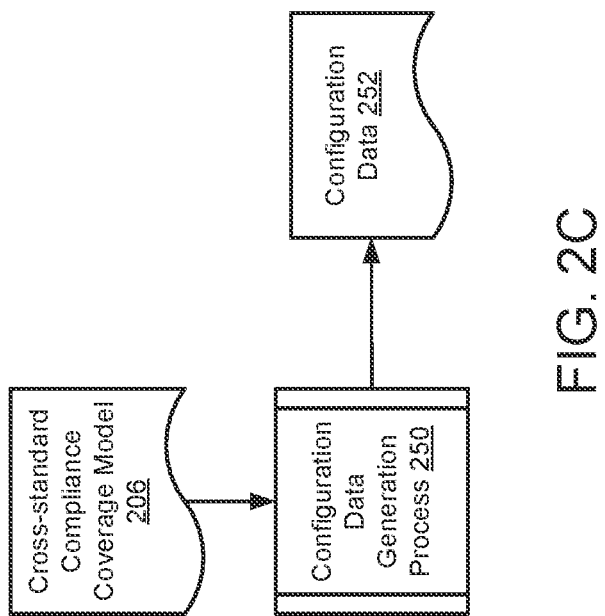
Figure 2D:
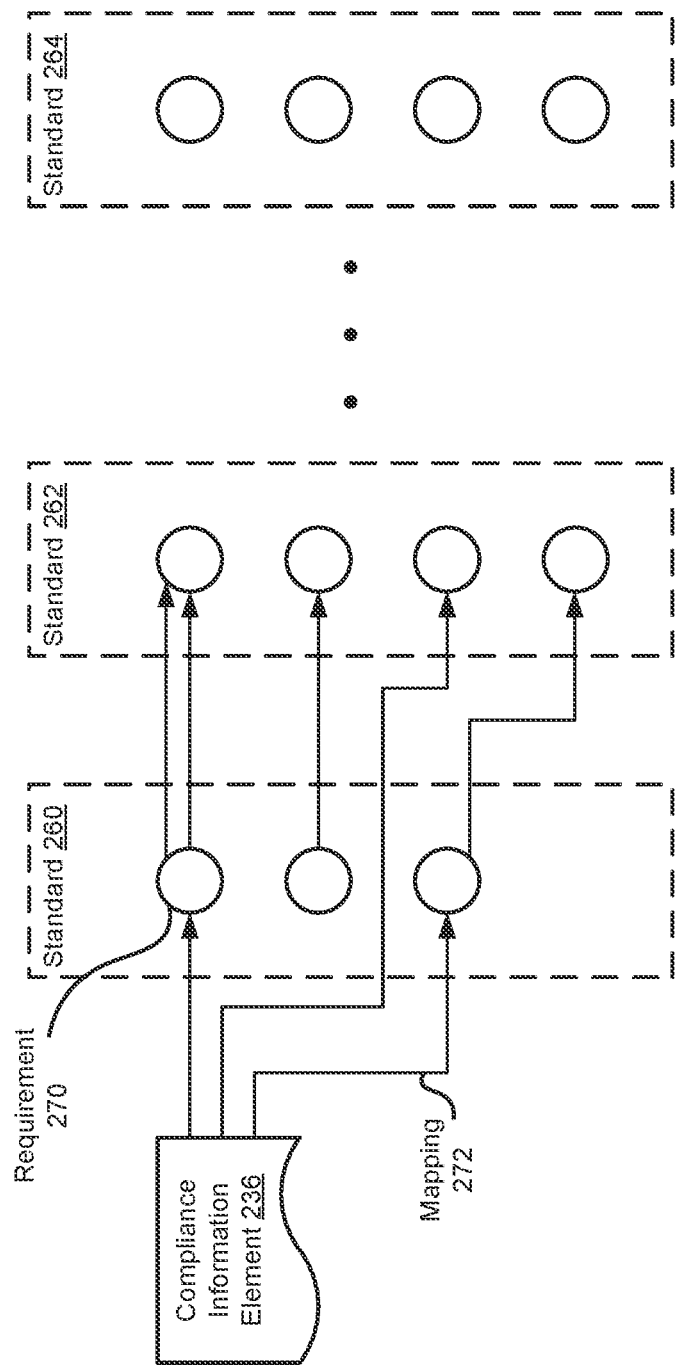

The operation of the infrastructure components may be subject to any number of standards (e.g., that attempt to retain performance of computer implemented services in a nominal manner). To identify whether the operation of the infrastructure components indicates compliance or non-compliance with any of the standards, agents may monitor the infrastructure components. Through the monitoring, information (e.g., facts) relevant to whether standards are complied with or violated by the computing infrastructure may be obtained. Refer to FIGS. 2B-2D for additional details regarding obtaining of relevant information for infrastructure components.

Infrastructure management system 110 may monitor computing infrastructure 100 for compliance with any number of standards, and may take action to manage impacts of non-compliance of computing infrastructure 100. By doing so, the computer implemented services provided by computing infrastructure 100 may be more likely to be provided in a nominal manner.

Figure 5:
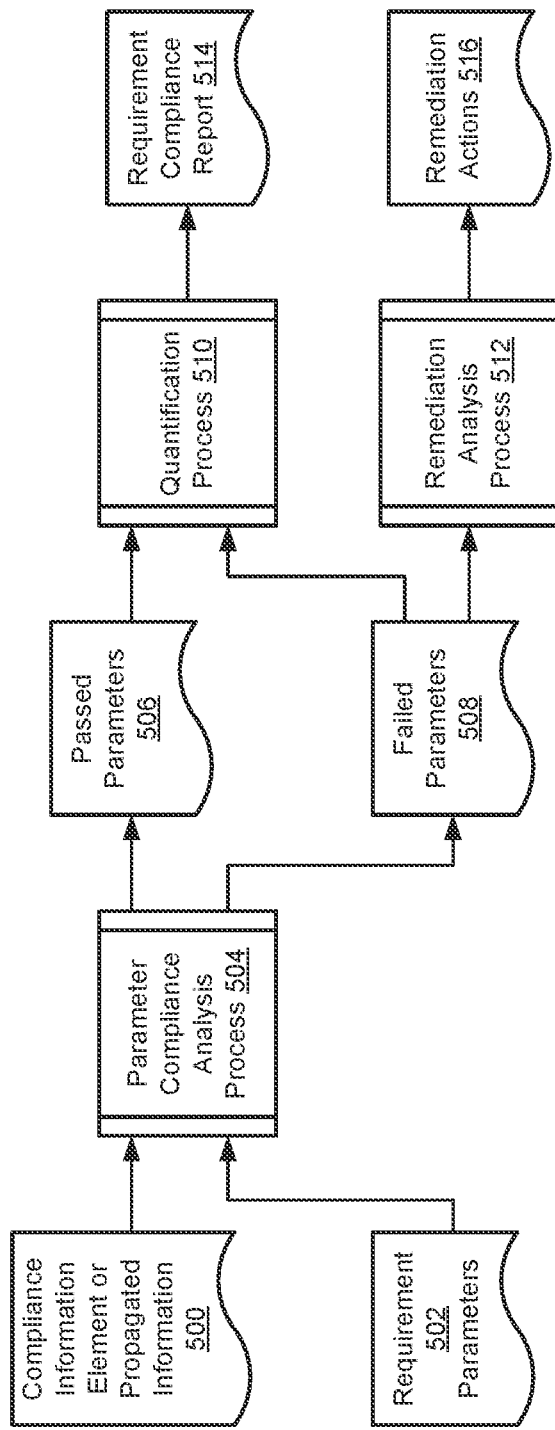
FIG. 5 shows a data flow diagram in accordance with an embodiment.

To monitor computing infrastructure 100 for compliance, infrastructure management system 110 may (i) deploy and use agents to collect information from infrastructure components 102-104, (ii) use the collected information to update a cross-standard compliance coverage model, (iii) use the updated cross-standard compliance coverage model to ascertain whether computing infrastructure 100 is in or out of compliance with any number of standards, and/or (iv) initiate performance of any number of actions to manage impacts of compliance failures by computing infrastructure 100. Refer to FIG. 2C for additional details regarding deploying agents. Refer to FIGS. 2A and 2D for additional details regarding updating of cross-standard compliance coverage models and identifying standard compliance. Refer to FIG. 5 for additional details regarding identifying levels of compliance with various standards.

Figure 7:
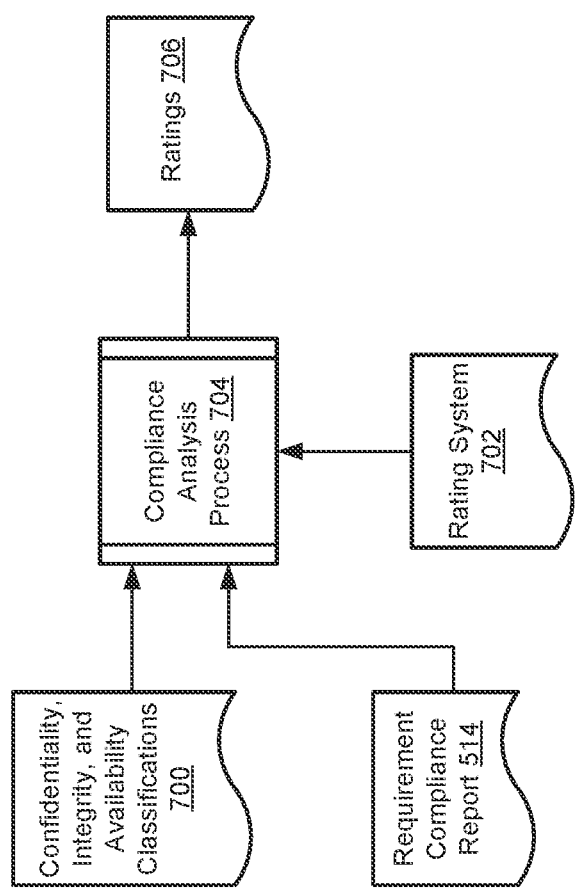
FIG. 7 shows a data flow diagram in accordance with an embodiment.
Figure 8A:
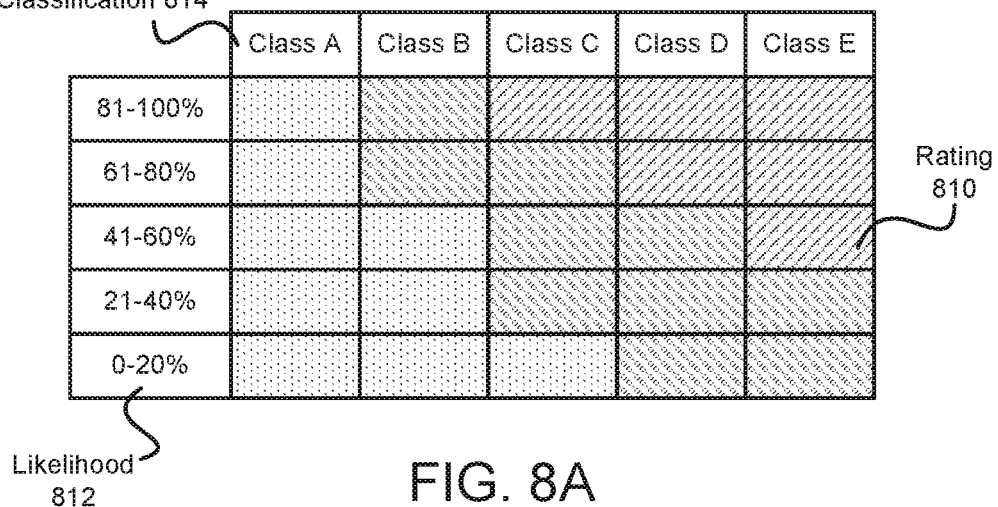
FIG. 8A shows a diagram of a rating system in accordance with an embodiment.
Figure 8B:
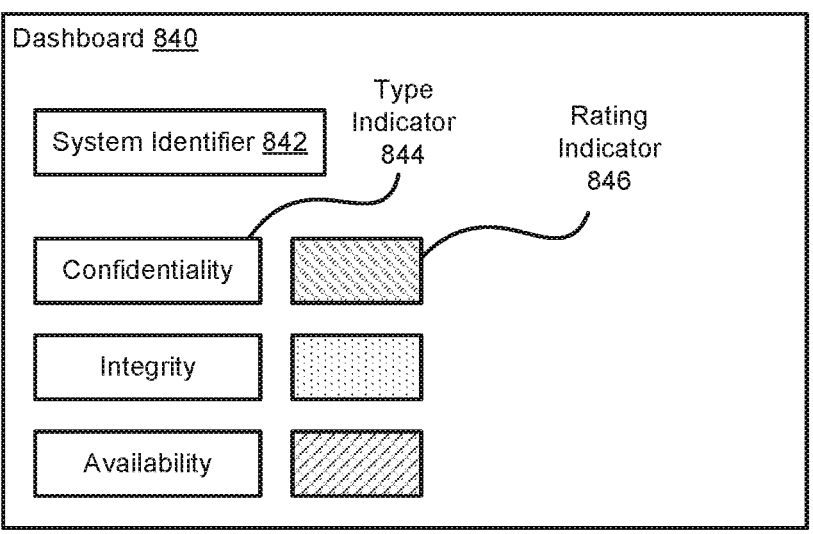
FIG. 8B shows a diagram of a dashboard in accordance with an embodiment.

The remediation actions may be selected based on confidentiality-integrity-availability (CIA) classifications for infrastructure. The CIA classifications may establish levels of concern for the infrastructure and may cause different remediation actions to be performed for similar compliance failures. The CIA classifications and identified compliance failures may be used to select the remediation actions to perform, and/or prioritize limited resources for remediation. Refer to FIGS. 7-8B for additional details regarding use of CIA classifications for managing infrastructure.

Figure 10:
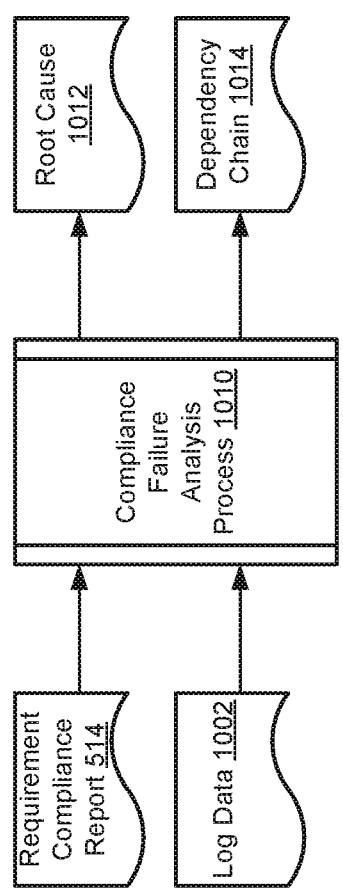
FIG. 10 shows a data flow diagram in accordance with an embodiment.
Figure 11:
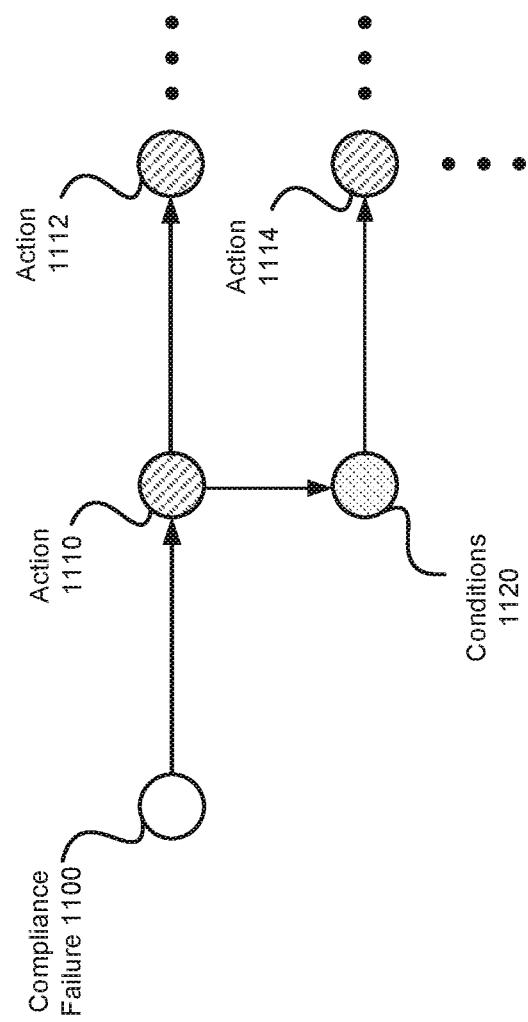
FIG. 11 shows a diagram illustrating analysis of activity of an infrastructure component in accordance with an embodiment.

To select actions to be performed as part of remediations, the activities of infrastructure components leading to compliance failures may be analyzed to identify chains of actions leading to the compliance failures. The chains of actions may be analyzed to identify potential actions that, when performed, may break the chains of actions thereby reducing the likelihood of similar compliance failures occurring in the future. Any of the potential actions may be used as part of remediations, and/or the chains of actions and/or potential actions may be used to inform administrators of options for improving the security posture of infrastructure components. Refer to FIGS. 10-11 for additional information regarding identifying potential actions.

When providing their functionality, any of computing infrastructure 100 and infrastructure management system 110 may perform all, or a portion, of the methods illustrated in FIGS. 3-4, 7, 9, and 12.

Any of computing infrastructure 100 and infrastructure management system 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 13.

Any of the components illustrated in FIG. 1 may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein. For example, a system may include any number of computing infrastructure 100 and/or other components not shown in FIG. 1. Any of the instances may perform similar and/or different functions performed by other instances.

Turning to FIG. 2A, a first data flow diagram in accordance with an embodiment is shown. In the data flow diagram, flows of data and processing of data are illustrated. Processes (e.g., executing software) are illustrated using a first set of elements (e.g., 220, 222) and data structures (e.g., tables, linked lists, databases, etc.) are illustrated using a second set of elements (e.g., 200-214). Similar elements are used in FIGS. 2B-2C to distinguish processes and data structures in data flow diagrams.

To ascertain compliance of computing infrastructure with any number of standards, infrastructure information 200 may be obtained. Infrastructure may include any number of compliance information elements (e.g., 202-204). Compliance information elements 202-204 may include information regarding an infrastructure component. The information may be mapped by cross-standard compliance coverage model 206 to portions of any number of standards (e.g., security standards, operational standards, regulatory standards, etc.). The mappings may also indicate how the content of each compliance information element shows either compliance or non-compliance with the corresponding portions of the standards.

Infrastructure information 200 may be obtained by receiving it from agents that monitor the infrastructure components. Refer to FIG. 2B for additional details regarding compliance information elements 202-204.

Infrastructure information 200 may be used in compliance validation process 220 to (i) update a state of cross-standard compliance coverage model 206 and (ii) establish compliance status 208. For example, compliance validation process 220 may use the mappings of cross-standard compliance coverage model to process compliance information elements 202-204. The processing may establish whether each compliance information element indicates whether the computing infrastructure complies with corresponding portions of standards. The state of cross-standard compliance coverage model 206 may be updated based on the determined compliance of the computing infrastructure. Thus, the state of cross-standard compliance coverage model 206 may indicate compliance and non-compliance with any number of portions of any number of standards. Refer to FIG. 2D for additional details regarding the state of cross-standard compliance coverage model 206.

The state of cross-standard compliance coverage model, once updated, may be used to generate compliance status 208 as part of compliance validation process 220. Compliance status 208 may reflect compliance of the computing infrastructure with respect to any number of standards.

Compliance status may include any amount of standard compliance data 210-212. Each portion of standard compliance data may indicate compliance with portions of a standard. For example, standard compliance data 210 may be a data structure that specifies which portions of a standard that computing infrastructure is in compliance with and other portions of the standard that computing infrastructure is out of compliance with.

For example, one of the standards may be the National Institutes of Standards and Technology 800-53 standard, which sets expectations regarding computing infrastructure for security purposes. A corresponding standard compliance data (e.g., 210) for the 800-53 standard may indicate which portions of the standard the computing infrastructure is in compliance and other portions of the standard that the computing infrastructure is out of compliance. Different standard compliance data may correspond to different standards.

The standards compliance data may indicate (e.g., quantify) compliance at both granular and/or macro levels. Refer to FIG. 5 for additional details regarding quantifying compliance.

Once generated, compliance status 208 may be used in compliance management process 222 to manage impacts of compliance failures. For example, during compliance management process 222, various actions keyed to compliance failures specified by compliance status 208 may be performed to attempt to manage the impact of these compliance failures. The actions may include, for example, sending various notifications, modifying operation of infrastructure components of the computing infrastructure, disabling various infrastructure components, etc. Refer to FIG. 5 for additional details regarding identifying actions that when performed may improve compliance with standards. Refer to FIG. 7 for additional details regarding selecting which actions of the identified actions to perform during remediation.

To implement the actions, compliance management process 222 may generate management actions 214. Management actions 214 may specify actions (e.g., to manage the impact) to be performed by various entities. Management actions 214 may be distributed to corresponding entities that will perform the actions. Once distributed, the actions may be performed by the entities.

For example, as will be discussed further with respect to FIG. 5, actions that may improve compliance may be identified initially based on granular quantification of compliance with different requirements of standards. During and/or along with quantification, actions that may improve compliance with each requirement may be identified. Management actions 214 may be identified based on the actions that are identified as likely improving compliance with the corresponding requirement. Then performance of actions may be prioritized based on CIA classifications and/or rating systems. Refer to FIG. 7 for additional details regarding prioritizing actions, and FIG. 8A for additional details regarding rating systems.

Additionally, as will be discussed further with respect to FIG. 10, potential actions that may reduce the likelihood of compliance failures occurring in the future may identified. The potential actions may be identified by reviewing activity of infrastructure components that lead to compliance failures, and configurations that allowed the activity to occur. Then performance of any of the identified potential actions may be prioritized based on CIA classifications and/or rating systems discussed in greater detail elsewhere. Refer to FIGS. 10-11 for additional details regarding identifying potential actions based on activity that lead to the compliance failures.

Turning to FIG. 2B, a second data flow diagram in accordance with an embodiment is shown. In the data flow diagram, flows of data and processing of data are illustrated. To acquire information usable to ascertain whether computing infrastructure is incompliance with standards, an agent 230 may be utilized.

For example, infrastructure component 102 may be hosted by data processing system 290. Other entities 103 may also be hosted by data processing system 290. The other entities may include, for example, operating systems, drivers, applications, etc.

Agent 230 may perform monitoring process 232 with respect to infrastructure component 102 and other entities 103. During monitoring process 232 information regarding operation of infrastructure component 102 and other entities 103 may be collected. Through monitoring process 232, configuration 240, state 242, and audit result 244 may be obtained.

Configuration 240 may include information regarding the configuration of infrastructure component 102 and/or other entities 103. The configuration may reflect various operations that may be selected and which influence operation of infrastructure component 102 and other entities 103 (e.g., such as requirements for use of secure connections, encryption, etc.). This information may be obtained by, for example, reading it from files that define configurations, requesting it from infrastructure component 102 and/or other entities 103, and/or via other methods.

State 242 may include information regarding the state of infrastructure component 102 and/or other entities 103. The state may reflect the operating state of infrastructure component 102 and other entities 103, and/or the state of the hardware support operation of infrastructure component 102 and/or other entities. This information may be obtained by, for example, requesting from management entities such as operating systems, requesting it from hardware components, reading various registers and/or files, and/or via other data collection methods.

Audit result 244 may include information regarding an outcome of an audit process performed on data processing system 290 and/or hosted entities. The audit process may be performed by agent 230 and/or other entities (e.g., another application may perform it at the request of agent 230). The audit result may reflect whether and to what extent data processing system and/or hosted entities passed the audit, or portions thereof. This information may be obtained by, for example, receiving it from another entity, through performance of the audit process, and/or via other data collection methods.

Additionally, information regarding the environment in which data processing system 290 reside may also be collected. The information may include connectivity information regarding other devices to which data processing system 290 is connected, information regarding security protocols implemented by the other devices, information regarding network security implemented by networks that interconnect the other devices, security protocols implemented by data processing system 290, and/or other information usable to characterize the extent of exposure to other devices and precautions that data processing system 290 may take regarding the other devices.

Further, logs of activity on data processing system 290 may also be obtained and provided to management entities. The logs may include records of actions performed by data processing system 290. The logs may allow specific actions that were performed that lead to compliance failures to be identified. Additionally, configuration 240 and/or state 242 may allow for the conditions that allowed the activity to occur to be identified. Similar actions leading the occurrence of these conditions and activity may be identified using the logs.

The information obtained through monitoring process 232 may be used to obtain compliance information element 236 (and/or may also be provided to infrastructure management system 110). For example, compliance information generation process 234 may ingest the information and generate compliance information element 236. Compliance information element 236 may be a data structure having a standardized format that allows for relevant mappings maintained by the cross-standard compliance coverage model to be identified and used to update the state of the cross-standard compliance coverage model.

The specific quantities monitored by monitoring process 232 and the information included by compliance information element 236 may be configured. Refer to FIGS. 2C-2D for additional details regarding configuration for compliance information element generation.

Once obtained, compliance information element 236 may be provided to infrastructure management system 110 for updating of the cross-standard compliance coverage model.

Turning to FIG. 2C, a third data flow diagram in accordance with an embodiment is shown. In the data flow diagram, flows of data and processing of data are illustrated. To acquire information usable to update the state of cross-standard compliance coverage model, an agent may be configured using configuration data 252.

Configuration data 252 may specify the information to be monitored by an agent, and how the information is to be used to generate compliance information elements. Configuration data 252 may be generated through configuration data generation process 250.

Configuration data generation process 250 may be performed when a new infrastructure component is identified for compliance monitoring. When new infrastructure components are identified, configuration data generation process 250 may be performed. During configuration data generation process 250, mappings from cross-standard compliance convergence model that specify the information which needs to be included in compliance information elements from the infrastructure component may be identified. Different mappings may be tagged with respect to different infrastructure components such that relevant mappings may be identified based on the infrastructure components. The identified mappings may be used to identify the content and format of the compliance information elements.

A procedure library or other data structure which defines monitoring procedures based on information to be included in compliance information elements may be used to identify monitoring procedures to be implemented by corresponding agents.

Once the procedures and informational content for compliance information elements, then configuration data 252 may be generated. After generation, configuration data 252 may be used to configure a corresponding agent. For example, configuration data 252 may be sent to the agent. The agent may configure its operation based on configuration data 252.

Turning to FIG. 2D, a fourth data flow diagram in accordance with an embodiment is shown. In the data flow diagram, flows of data and processing of data are illustrated. Additionally, various standards 260-264 of the cross-standard compliance coverage model are illustrated using a series of circles. Each circle corresponds to a portion of the respective standard (which may specify any number of requirements (e.g., 270) for compliance with the portion of the standard, each circle may represent a requirement, and each requirement may include parameters that define various sub-requirements of the requirement), and each circle is associated with a portion of the state of the cross-standard compliance coverage model. While illustrated with a finite number of circles corresponding to portions of standards, it will be appreciated that a standard may include any number of portions.

Additionally, in FIG. 2D, lines terminating in arrows represent mappings (e.g., 272) that define relationships between information and portions of the state of cross-standard compliance coverage model. For example, each mapping may specify (i) information on which a portion of the state is based, (ii) rules for identify the portion of the state based on the information, (iii) identities of infrastructure components to which the mapping is applicable, and/or other information usable to identify relevant information and identify portions of the state of the cross-standard compliance coverage model.

For example, in a portion of a standard related to networking, a mapping may specify that (i) information regarding ports is relevant, (ii) that the ports must be inactive to comply with the portion of the standard, and (iii) the mapping is relevant to network components of computing infrastructure. In this example, configuration information for an agent may be generated that specifies collection of the information regarding the ports, and inclusion of the information in a compliance information element (e.g., 236).

When received by infrastructure management system 110, the information element may be processed based on the rules specified in the mapping. In this example, the rules may specify that the computing infrastructure is in or out of compliance depending on whether the port is open. For purposes of example, if mapping 272 specifies that the port is to be closed, but compliance information element 236 specifies that the port is open, then the portion of the state associated with standard 260 may be modified to reflect that the computing infrastructure is out of compliance.

Other mappings of the cross-standard compliance coverage model may specify that some portions of standards depend on compliance with portions of other standards. For example, in FIG. 2D, some arrows representing mappings extend from the representation of the portion of standard 260 to the representations of the portions of standard 262. These two standards may be different, but may define compliance with portions of standard 262 in terms of compliance with portions of standard 260. In this manner, the cross-standard compliance coverage model may propagate changes in compliance across multiple standards without needing to obtain other compliance information elements and/or perform other type of computations to evaluate compliance information elements. Accordingly, when standard compliance data (e.g., 210) is generated for a standard, the information maintained by the cross-standard compliance coverage model regarding the standard may be kept up to date and propagated to identify the states compliance with any number of standards.

The mappings of the cross-standard compliance coverage model may be established by, for example, subject matter experts. As standards are added or removed from the cross-standard compliance coverage model, the mappings may be correspondingly updated.

As discussed above, the components of FIG. 1 may perform various methods to manage the compliance with various standards to improve the likelihood of desirable computer implemented services being provided. FIGS. 3-4, 6, 9, and 12 illustrate methods that may be performed by the components of the system of FIG. 1. In the diagrams discussed below and shown in FIGS. 3-4, 6, 9, and 12, any of the operations may be repeated, performed in different orders, and/or performed in parallel with or in a partially overlapping in time manner with other operations.

Figure 3:
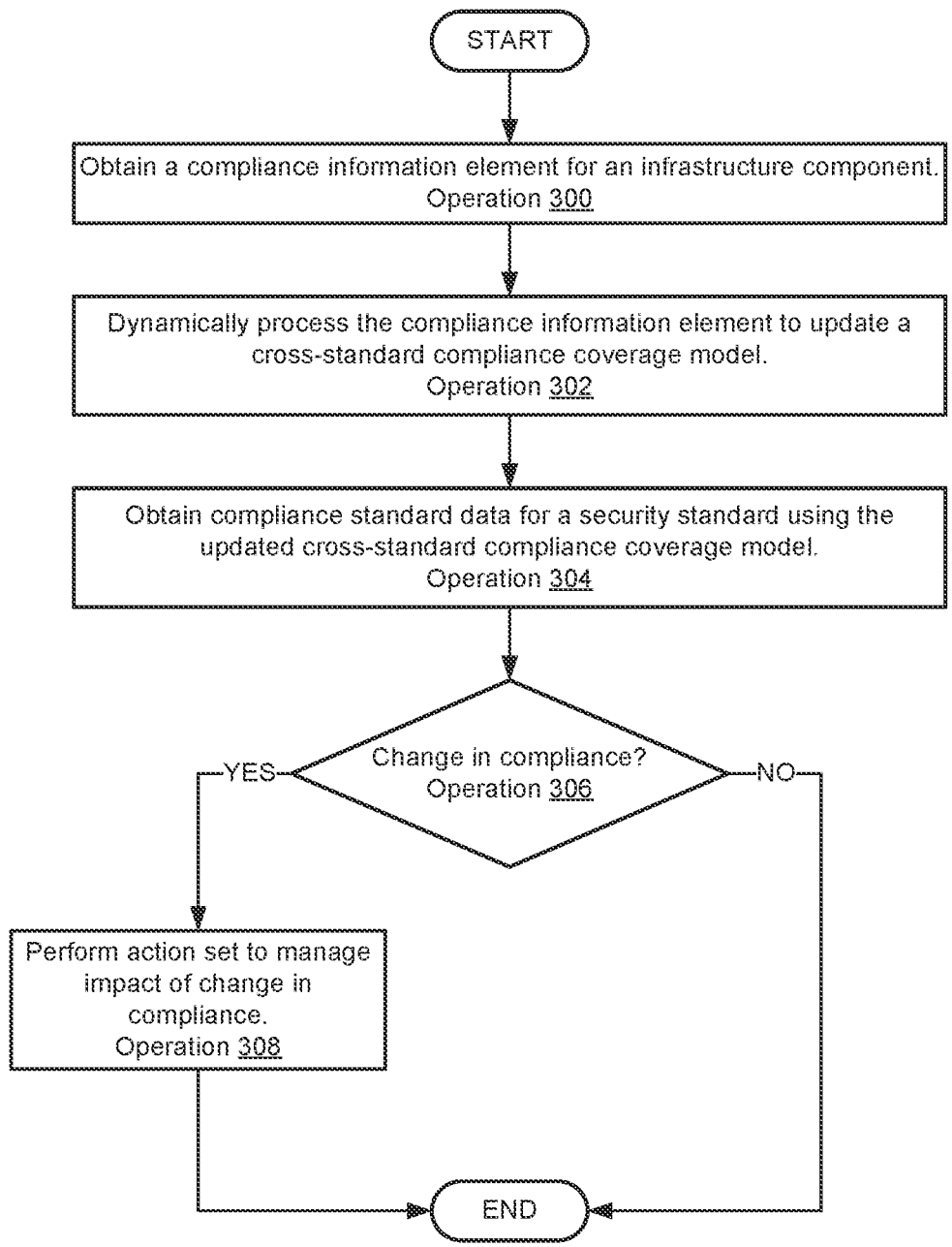
FIGS. 3-4 show flowchart diagrams illustrating methods in accordance with an embodiment.

Turning to FIG. 3, a flow diagram illustrating a method for managing the impact of changes in compliance with standards in accordance with an embodiment is shown. The method may be performed in part by computing infrastructure 100, infrastructure management system 110, and/or other components of the system shown in FIG. 1.

At operation 300, a compliance information element for an infrastructure component is obtained. The compliance information element may be obtained from an agent. The agent may generate the compliance information element. The compliance information element may be obtained by (i) receiving it via a message, (ii) reading it from storage, and/or via other methods.

At operation 302, the compliance information element is dynamically processed to update a cross-standard compliance coverage model. The compliance information element may be dynamically processed by (i) identifying mappings associated with content of the compliance information element, (ii) identifying processing rules specified by the mappings, and (iii) processing the content of the compliance information elements based on the processing rules to update the state (e.g., compliance state indicating whether computing infrastructure complies with any number of standards) of the cross-standard compliance coverage model. The processing may update the state of compliance with any number of portions of standards of the cross-standard compliance coverage model. For example, as discussed above, changes in compliance with portions of a first standards may be used to automatically identify changes in portions of other standards (e.g., based on inter-standard mappings rather than compliance information element to standard mappings).

At operation 304, compliance standard data for a security standard is obtained using the updated cross-standard compliance coverage model. The compliance standard data may be obtained by (i) instantiating a data structure and (ii) populating the data structure with information reflecting compliance with the security standard based on corresponding portions of the cross-standard compliance coverage model. The resulting data structure may specify (i) portions of the security standard for which the security infrastructure is in compliance and/or (ii) other portions of the security standard for which the security infrastructure is out of compliance.

The compliance standard data may be obtained via the method illustrated in FIG. 5, and/or other manners.

At operation 306, a determination is made regarding whether a change in compliance of the computing infrastructure has occurred. The determination may be made based on the compliance standard data (and/or compliance standard data for any number of standards). For example, if the compliance standard data indicates that the computing infrastructure has fallen out of compliance with one or more portions of one or more standard (and/or other standards), then it may be determined that a compliance change has occurred.

If a compliance change has occurred, then the method may proceed to operation 308. Otherwise the method may end following operation 306.

At operation 308, an action set may be performed to manage an impact of change in compliance of the computing infrastructure. The action set may be performed by identifying actions to be performed based on one or more compliance failures specified by the compliance standard data. The actions may include, for example, sending notification or other types of information regarding the compliance failures to one or more recipients (e.g., administrators, decision makers, etc.), documenting the compliance failures, initiating automatic attempts to remediate the compliance failures, initiating shut down/quarantining/other actions to limit exposure of the portions of the computing infrastructure that has failed compliance with the standards, and/or other actions that may reduce the impact of the compliance changes. The actions may be identified by, for example, performing a lookup in a data structure that specifies actions to be performed for different types of compliance failures/changes in compliance. Performance of the actions may then be initiated (e.g., by generating and sending instructions regarding the actions to entities tasked with performing the actions).

Figure 12:
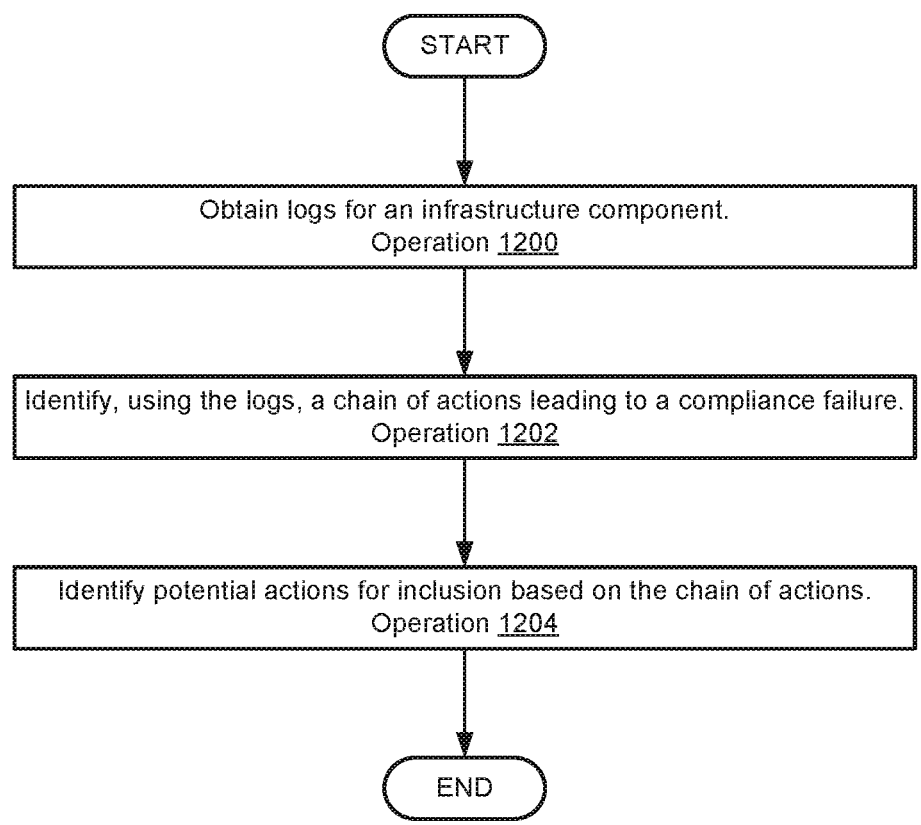
FIG. 12 shows a flowchart diagram illustrating a method in accordance with an embodiment.

In an embodiment, the actions are identified, at least in part, using the method illustrated in FIG. 12. During the identification, any of the data flows and processes described with respect to FIGS. 10-11 may be performed.

Once identified, some of the actions may be selected for performance based on CIA classifications and/or rating systems for compliance. For example, the CIA classifications may classify infrastructure for different concerns, and the level of the concerns may be used to determined which actions to perform.

For example, some of the actions may be selected based on (i) the CIA classifications which may be used to set a cap on resource expenditures for the remediation actions thereby limiting the number that may be included in the action set, (ii) to prioritize some actions over others based on which of confidentiality, integrity, and availability is more important for the infrastructure component, and/or other factors.

Figure 9:
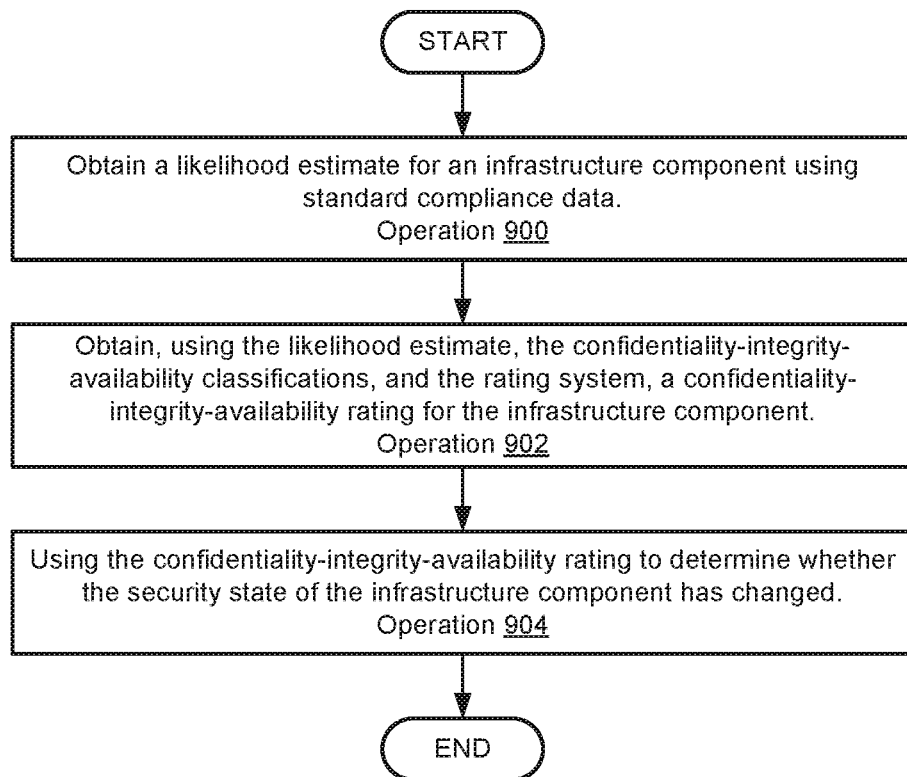
FIG. 9 shows a flowchart diagram illustrating a method in accordance with an embodiment.

The actions may be selected, for example, using the method illustrated in FIG. 9.

The method may end following operation 308.

Figure 4:
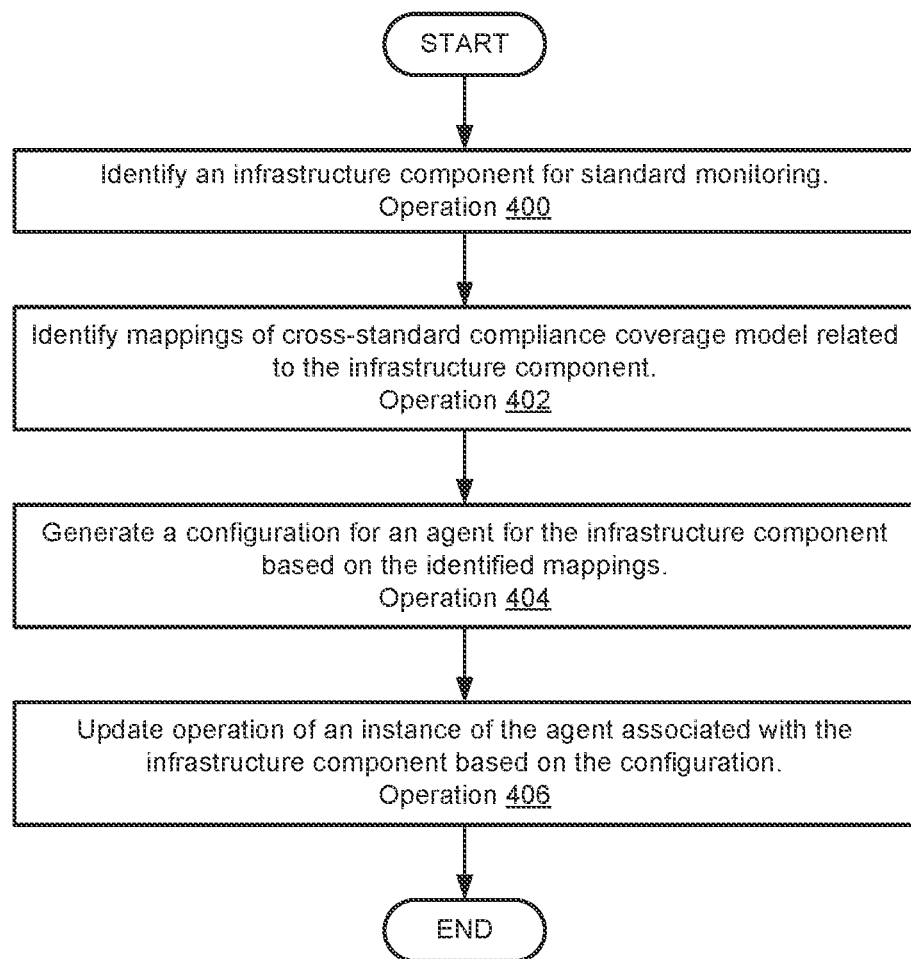

Turning to FIG. 4, a flow diagram illustrating a method for obtaining compliance information elements in accordance with an embodiment is shown. The method may be performed in part by computing infrastructure 100, infrastructure management system 110, and/or other components of the system shown in FIG. 1.

At operation 400, an infrastructure component may be identified for standard monitoring. The infrastructure component may be identified by (i) receiving information regarding the infrastructure component from another entities, (ii) by reading the information from storage, (iii) by obtaining user input indicating the infrastructure components, and/or via other methods.

At operation 402, mappings of a cross-standard compliance coverage model related to the infrastructure components are identified. The mappings may be identified based on a type of the infrastructure component. Mappings of the cross-standard compliance coverage model may be associated with different types of infrastructure components. The mappings may be identified based on the associations.

At operation 404, a configuration for an agent for the infrastructure component is generated based on the identified mappings. The configuration for the agent may be generated by (i) instantiating a data structure, (ii) populating the data structure with information regarding quantities used by the mappings to identify compliance with standards of the cross-standard compliance coverage model, and/or (iii) populating the data structure with information regarding a format for compliance information elements.

At operation 406, operation of an instance of the agent associated with the infrastructure component is updated based on the configuration. The operation of the instance of the agent may be updated by (i) providing the instance of the agent with the data structure (e.g., the agent may self-configure), (ii) providing a control plane or other management entity with the data structure (e.g., which may configure the operation of the agent using the data structure), (iii) by instantiating the agent with the data structure (e.g., by sending instructions to a data processing system that hosts the infrastructure component), and/or via other methods.

The method may end following operation 406.

Once configured, the agent may collect information as specified by the configuration, may generate compliance information elements as specified by the configuration, and may forward or otherwise provide the compliance information elements to other entities for use.

Using the methods illustrated in FIGS. 3-4, embodiments disclosed here may facilitate near real time compliance analysis for computing infrastructure. The compliance analysis may then be used to manage the impact of changes in compliance. Consequently, computer implemented services by the compliance infrastructure may be more likely to meet expectations.

Turning to FIG. 5, a fifth data flow diagram in accordance with an embodiment is shown. In the data flow diagram, flows of data and processing of data are illustrated. Processes (e.g., executing software) are illustrated using a first set of elements (e.g., 504, 510, 512) and data structures (e.g., tables, linked lists, databases, etc.) are illustrated using a second set of elements (e.g., 500, 502, 506, 508, 514, 516).

To obtain compliance data for a standard, requirements of the standard may be evaluated on a parameter by parameter basis. In FIG. 5, an evaluation for a requirement 502 of a standard is shown. Requirement 502 may include any number of parameters. Each parameter may specify, for example, a characteristic of infrastructure that must be met for the requirement to be met.

To evaluate to an extent that requirement 502 is met, parameter compliance analysis process 504 may be performed. During parameter compliance analysis process 504, the parameters of requirements 502 may be individually evaluated based on either an acquired compliance information element or propagated information (e.g., 500) from another standard. As discussed with respect to FIG. 2D, some requirements of standards may be based on the state of compliance with other standards.

Passed parameters 506 and failed parameters 508 may be identified via parameter compliance analysis process 504. The number of failed parameters 508 and passed parameters 506 may be used in quantification process 510. During quantification process 510, a quantification for the extent of compliance with requirement 502 may be identified. For example, a ratio of the passed parameters to the total parameters of requirement 502 may be obtained and added to requirement compliance report 514.

Requirement compliance report 514 may quantify the extent to which requirement 502 was met. While not shown, requirement compliance report 514 may be aggregated with other requirement compliance reports to obtain a report reflecting the extent of compliance with any number of requirements of a standard. Additionally, a quantification based on the level of compliance with each of the requirements may be obtained. For example, the quantification may be obtained by calculating an average, weighted average, and/or other quantity based on the extent of compliance with the requirements of the standard. The extent of compliance for each requirement and the standard as a whole may be standard compliance data (e.g., 210-212) for the standard.

Failed parameters 508 may also be used in remediation analysis process 512 to identify remediation actions 516. Remediation actions 516 may be identified by performing lookups or other types or processing based on failed parameters 508. The processing may return actions which when performed by infrastructure may be likely to cause the parameter to be passed. For example, the actions may modify the manner in which the infrastructure operates. The change in operation of the infrastructure may be likely to cause the parameter to be passed during a future parameter compliance analysis process. Remediation actions 516 may include any number of actions associated with any number of failed parameters 508.

Once obtained, the remediation actions may be screened to identify a final set of actions to perform as a remediation action set. Refer to FIG. 7 for additional details regarding identifying a final remediation action set.

Figure 6:
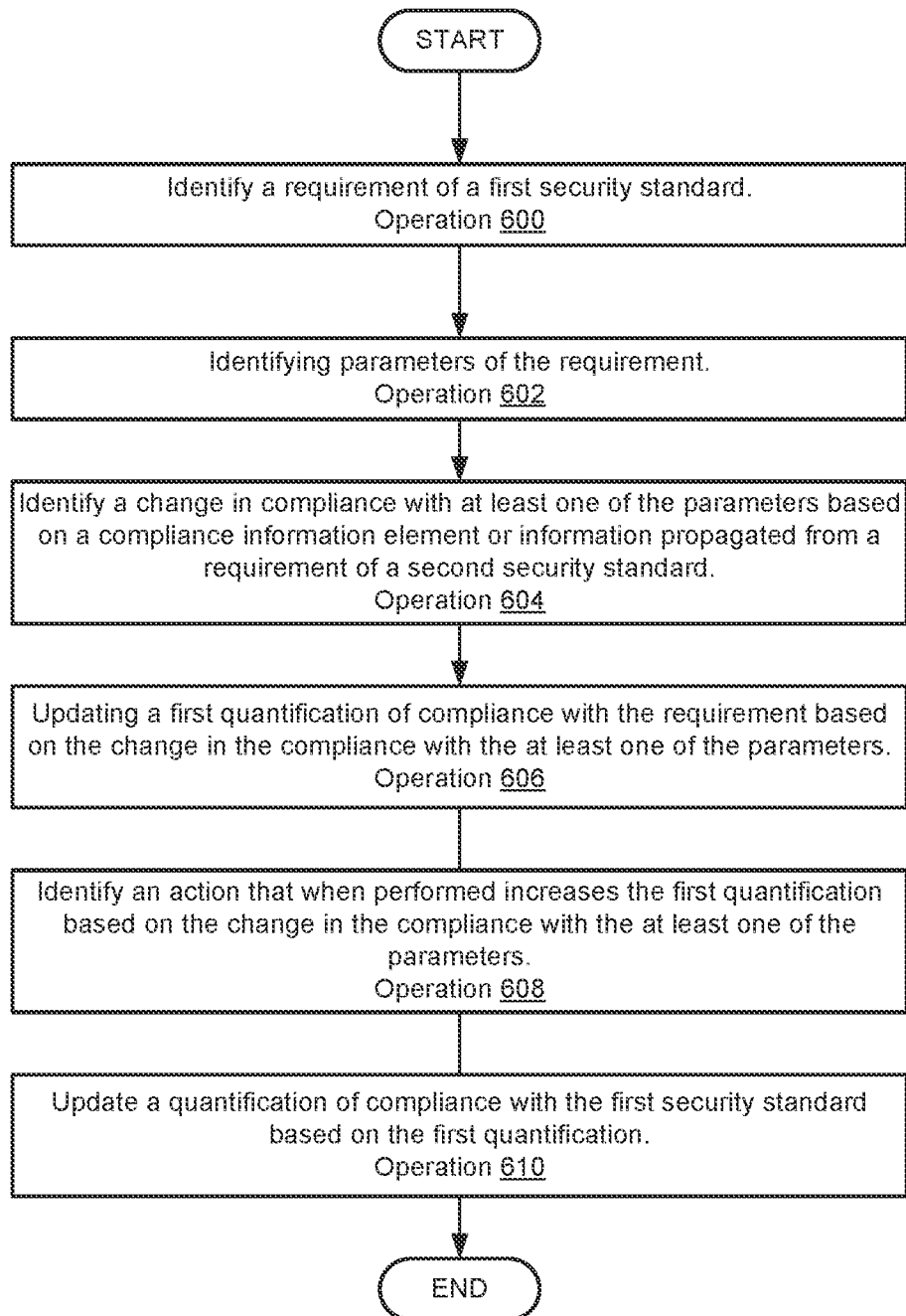
FIG. 6 shows a flowchart diagram illustrating a method in accordance with an embodiment.

Turning to FIG. 6, a flow diagram illustrating a method for obtaining compliance standard data in accordance with an embodiment is shown. The method shown in FIG. 6 may be an expansion of operation 304 shown in FIG. 3. The method may be performed in part by computing infrastructure 100, infrastructure management system 110, and/or other components of the system shown in FIG. 1.

At operation 600, a requirement of a first security standard is obtained. The requirement may be obtained by reading the requirement from storage or receiving the requirement from another device.

At operation 602, parameters of the requirement are identified. The parameters may be identified by parsing the requirement.

At operation 604, a change in compliance with at least one of the parameters is identified based on a compliance information element or information propagated from a requirement of a second security standard. The change in compliance may be identified using the compliance information element when the cross-standard compliance coverage model specifies the requirement in terms of the content of the compliance information element, and the change in compliance may be identified using information propagated from the requirement of the second security standard when the cross-standard compliance coverage model specifies the requirement in terms of the content of the compliance information element. As discussed with respect to FIG. 2D, the requirement may be specified in terms of either of these data structures to facilitate identification of compliance with any number of standards.

The change in compliance may be identified by performing processing as specified by mappings of the cross-standard compliance coverage model. The result of the processing may indicate compliance with respect to each of the at least one of the parameters. The change in compliance may be identified by comparing the new state of the parameters to the old states (e.g., a change in state may indicate a change in compliance).

At operation 606, a first quantification of compliance with the requirement is updated based on the change in the compliance with the at least one of the parameters. The quantification may be updated by dividing the number of parameters which are complied with based on the total number of parameters of the requirement. It will be appreciated that some parameters may be weighted, and/or other modifiers may be present depending on a desired goal for the quantification.

At operation 608, an action that when performed increases the first quantification is identified based on the change in the compliance with the at least one of the parameters. The action may be identified by performing a lookup or other processing operation to identify the action. The processing may use the at least one of the parameters, or a portion thereof, as a key. For example, an identifier of one of the at least one of the parameters may be used to perform a lookup, which may return the action.

At operation 610, a quantification of compliance with the first security standard may be updated based on the first quantification. The quantification may be similarly to first quantification. For example, the first quantification may be used to calculate a ratio of total passed parameters divided by the total number of parameters of the first security standard. Like the first quantification, the quantification of the compliance with the first security standard may weight certain parameters to meet various goals.

The method may end following operation 310.

Thus, using the method illustrated in FIG. 6, both granular and macro level quantification of compliance may be obtained. These quantifications may be used to select how action sets are performed to manage the impact of changes in compliance.

For example, the actions identified in operation 608 may be one of the actions included in an action set. Similarly, the granular and global quantifications may be used to select actions of the action set, may be used as part of the actions in the action set, and/or may otherwise be used to manage the impacts of changes in compliance.

When deciding on the actions to include in the action set, CIA classifications for infrastructure may be taken into account. As noted above, the CIA classifications may specify levels of concern for the infrastructure. These levels of concern may be used, in part, to select the extent of the remediation to be performed.

Turning to FIG. 7, a sixth data flow diagram in accordance with an embodiment is shown. In the data flow diagram, flows of data and processing of data are illustrated. Processes (e.g., executing software) are illustrated using a first set of elements (e.g., 704) and data structures (e.g., tables, linked lists, databases, etc.) are illustrated using a second set of elements (e.g., 700, 514, 702, 706).

Different infrastructure components may perform different functions as part of a distributed system. Consequently, compromise of different infrastructure components may have different ramifications regarding confidentiality (e.g., of data), integrity, and availability of functionality provided by the distributed system. Accordingly, it may be more important to ensure a greater level of compliance with standards for some infrastructure components than for other infrastructure components.

To manage different infrastructure components, CIA classifications 700 for infrastructure components may be maintained. CIA classifications 700 may include classifications for different infrastructure components regarding confidentiality, integrity, and availability. Thus, sub-classifications for each of these separate concerns for each infrastructure component may be included in CIA classifications 700. The ratings may be established by an operator of the infrastructure, or other interested party.

CIA classifications 700 may be used in compliance analysis processes 704 through which ratings 706 are obtained. During compliance analysis process 704, ratings regarding confidentiality, integrity, and availability of an infrastructure component are obtained. These ratings may be quantitative (e.g., on a scale such as 1-10) or qualitative (e.g., poor, average, good). The ratings may be used to select the extent of remediations to be performed, as well as ascertain whether a compliance change for the infrastructure component has occurred.

During compliance analysis process 704, requirement compliance reports (e.g., 514) for an infrastructure component may be ingested and used to calculate a likelihood of an compromise occurring. As discussed above, a requirement compliance report may specify granular and macro level quantifications of compliance with a standard. The likelihood may be calculated by subtracting the macro level quantification of compliance with the standard from 100%. For example, if an infrastructure component is rated as 82% compliant in requirement compliance report 514, then a likelihood of compromise may be calculated as 18% (e.g., 100−82=18).

Once obtained, the CIA classifications and likelihood may be used to obtain ratings 706 using rating system 702. Rating system 702 may specify a formula or other function through which the likelihood and sub-classifications from the CIA classifications may be used to obtain a sub-rating of ratings 706. Refer to FIG. 8A for additional details regarding an example rating system.

For example, the CIA ratings may include three numerical values indicating classifications for confidentiality, integrity, and availability of an infrastructure component. Sub-ratings may be calculated using each of these numerical values by separately ingesting the numerical rating and the likelihood into a function. The function may then output a numerical value for the sub-rating. The sub-ratings may be aggregated to obtain ratings 706. The ratings may reflect the relative level of concern for the risk presented by the infrastructure component. These ratings may be used, for example, (i) to select the extent of remediations that will be performed, (ii) to inform persons of the risks presented by the infrastructure component, and/or for other purposes. Refer to FIG. 8B for additional details regarding information persons of risks presented by the infrastructure.

Ratings 706 may provide separate numerical scores reflecting the level of risk for confidentiality, integrity, and availability presented by the infrastructure component.

Turning to FIG. 8A, a diagram of an example rating system in accordance with an embodiment is shown. The example rating system may be usable to rate risk based on CIA classifications and likelihood of compromise. In FIG. 8A, the rating system may be a binned function of the product of the likelihood and the CIA classification.

For example, the rating system may ascribe different levels of risk based on (i) ranges of likelihood of an infrastructure component being compromised, and (ii) CIA classification values.

The likelihood (e.g., 812) may be binned into buckets of approximate 20% each (i.e., 0-20%, 21-40%, etc.), and the CIA classification (e.g., 814) may be binned into different ranges A-E. Thus, if the CIA classifications includes values that fall within a range of 1-5, a value of 0-1 may fall into class A, a value greater than 1 but less than 2 may fall into class B, etc. The rating system may ascribe a different rating (e.g., 810) based on the product of the classification range and likelihood range. In FIG. 8A, different in fill patterns are used to represent the different ratings ascribed to different combinations of likelihood range and classification range. As seen in FIG. 8A, the rating system may ascribe different or similar ratings for different classification ranges and likelihood ranges. This example rating system may balance level of concern for CAI and likelihood. However, it will be appreciated that a rating system may more heavily weight CIA concern or likelihood, and may include more granularized ratings.

For example, if a CIA classification includes a confidentiality value of 1 for an infrastructure component, and the likelihood of compromise was found to be 19%, then the rating system may ascribe a "low" confidentiality risk rating to the infrastructure component. In contrast, if the CIA classification includes a confidentiality value of 4 for an infrastructure component (e.g., class D), and the likelihood of compromise was found to be 19%, then the rating system may ascribe a "medium" confidentiality risk rating to the infrastructure component.

Further, if the CIA classification includes a confidentiality value of 4 for an infrastructure component (e.g., class D), and the likelihood of compromise was found to be 65%, then the rating system may ascribe a "high" confidentiality risk rating to the infrastructure component.

Ratings for integrity and availability may be obtained in similar manners. These ratings may be used to select the extent of remediations to be performed as well as convey the CIA risks presented by the infrastructure component.

Turning to FIG. 8B, a diagram of dashboard 840 in accordance with an embodiment is shown. Dashboard 840 may be displayed to a person to inform the person of risk and allow user feedback to be obtained.

When displayed to the person, dashboard 840 may be populated with graphical elements to convey information regarding CIA risk presented by an infrastructure component. To convey the information, dashboard 840 may include system identifier 842, any number of type indicators (e.g., 844) and any number of rating indicators (e.g., 846). Each of these portions of dashboard 840 is discussed below.

System identifier 842 may be an identifier of an infrastructure component for which CIA risk information is displayed. The identifier may be a name that conveys to a person for which infrastructure component information is being displayed.

The type indicators (e.g., 844) may indicate different types of CIA risk presented by the infrastructure component.

The rating indicators 846 may be positioned proximate to the type indicators and may be graphical representations indicating the level of the type of the risk indicated by the corresponding risk indicator. In FIG. 8B, different in fill patterns are used to express different ratings. However, other graphical element systems may be used to convey the level of each type of CIA risk presented by an infrastructure component.

While not shown, dashboard 840 may include user controls that through which the user may select which infrastructure components to display information about, to show information regarding different types of risk, to identify infrastructure components with risk levels exceeding certain thresholds, etc.

Additionally, a user may provide user input via dashboard 840 to, for example, select actions to perform as part of remediation. For example, when a user selects a type indicator, a sub-display indicating different actions that may reduce the type of the risk, as well as likely levels of risk reduction if the actions are performed. The actions may be any of those identified as described with respect to FIG. 5 (e.g., remediation actions 516). The user may select, double click, and/or use other modalities to select the actions to perform as part of a remediation.

Turning to FIG. 9, a flow diagram illustrating a method for obtaining CIA ratings in accordance with an embodiment is shown. The method shown in FIG. 9 may be an expansion of portions of operations 304-308 shown in FIG. 3. The method may be performed in part by computing infrastructure 100, infrastructure management system 110, and/or other components of the system shown in FIG. 1.

At operation 900, a likelihood estimate for an infrastructure component is obtained using standard compliance data. The likelihood estimate may be obtained by subtracting the compliance quantification(s) specified by the compliance standard data from 100%, or a different quantification may be obtained.

At operation 902, CIA ratings for an infrastructure component are obtained using the likelihood estimate, CIA classifications for the infrastructure component, and a rating system. The CIA ratings may be obtained by ingesting the likelihood estimate and the CIA classifications into the rating system. The rating system may output the CIA ratings.

At operation 904, the CIA ratings are used to determine whether the security state of the infrastructure component has changed. The CIA ratings may be used by presenting, using the confidentiality-integrity-availability rating, a dashboard; obtaining, using the dashboard, user input responsive to the confidentiality-integrity-availability rating; and using the user input to make the determination. For example, the user input may indicate whether the security state of the infrastructure component has changed.

The confidentiality-integrity-availability classifications may include a first classification for confidentiality. The first classification may indicate a numerical value within a range (e.g., 1-5) for confidentiality concern for the infrastructure component. Similarly classifications for integrity and availability may also be included in the CIA classifications.

The method may end following operation 904.

Thus, the CIA classifications may be used to select the extent of remediations to perform for infrastructure components. To perform the remediations actions set may be established. To identify actions for potential inclusion in actions sets, activity of infrastructure components leading to compliance failures may be analyzed.

Turning to FIG. 10, a seventh data flow diagram in accordance with an embodiment is shown. In the data flow diagram, flows of data and processing of data are illustrated. Processes (e.g., executing software) are illustrated using a first set of elements (e.g., 1010) and data structures (e.g., tables, linked lists, databases, etc.) are illustrated using a second set of elements (e.g., 514, 1002, 1012, 1014).

To identify actions to potentially be performed to remediate infrastructure components, root causes 1012 for compliance failures may be identified and dependency chains (e.g., 1014) for the root causes may also be identified via compliance failure analysis process 1010. During compliance failure analysis process 1010, information regarding compliance failures (e.g., as specified by requirement compliance reports 514) and the activity of and infrastructure component may be obtained. For example, log data 1002 may be obtained. The log data may include listings of actions performed by the infrastructure component, conditions experienced by the infrastructure component, etc. Log data 1002 may include any type and quantity of information. Log data 1002 may be obtained by agents hosted by the infrastructure component, as described with respect to FIG. 2B (e.g., 240, 242, 244, etc.).

The compliance failures and activity of the infrastructure component may be used during compliance failure analysis 1010 to obtain chains of activities and configurations of the infrastructure component leading to the compliance failures.

Turning to FIG. 11, a diagram of an analysis process in accordance with an embodiment is shown. In FIG. 11, actions identified via log data are illustrated using circles with a first infill pattern (e.g., 1110, 1112), conditions present identified via the log data are illustrated using circles with a second infill pattern (e.g., 1120), and compliance failures are illustrated using circles with no infill pattern.

During the analysis process, compliance failure 1100 for the infrastructure component may be identified. The conditions for compliance failure 1100 may be identified based on the corresponding security standard.

Log data 1002 may be parsed (e.g., searched) to identify any actions performed impacting the identified conditions. The identified actions may then be used to start establishing a chain of actions through which a root cause for the compliance failure may be identified.

For example, consider an example scenario where a single action (e.g., 1110) is identified as leading to the condition of the infrastructure component that triggered compliance failure 1100. In the analysis, action 1110 may be linked to compliance failure 1100 initially as being a condition precedent for compliance failure 1100. However, action 1110 may not be the root cause because action 1100 may merely be another action performed in a series of actions and may only have been performable due to other conditions (e.g., 1120) existing in the infrastructure component.

Once identified, action 1110 may be further analyzed to identify whether any other actions (e.g., 1112) were conditions precedent to the performance of action 1110, and whether any conditions (e.g., 1120) were required to be present for action 1110 to be performed. This process may be repeated for actions (e.g., 1112) that are condition precedents for other actions.

Additionally, each condition (e.g., 1120) that is a condition precedent for an action may be analyzed to identify actions (e.g., 1114) that were performed leading to the conditions being present.

These processes may be performed until actions (e.g., potential root causes) for which there are no condition precedent actions or conditions are identified. The potential root cause actions may then be subjected to additional screening and/or analysis to identify any of the potential root causes as root causes for the compliance failure.

Returning to the discussion of FIG. 10, root cause 1012 may be populated using the identified root causes. Dependency chain 1014 may include information regarding the dependencies between the conditions, actions, and compliance failures as illustrated in FIG. 10.

Root cause 1012 and dependency chain 1014 may be used, for example, to identify actions that, when performed by the infrastructure component, are likely to remediate the compliance failure and/or prevent new compliance failures from being caused in the future.

Turning to FIG. 12, a flow diagram illustrating a method for identifying potential actions to include in an action set in accordance with an embodiment is shown. The method shown in FIG. 12 may be an expansion of portions of operations 304-308 shown in FIG. 3. The method may be performed in part by computing infrastructure 100, infrastructure management system 110, and/or other components of the system shown in FIG. 1.

At operation 1200, logs (e.g., including log data) for an infrastructure component are obtained. The logs may be obtained by receiving them from the infrastructure component. A requirement compliance reports may also be obtained by reading them from storage.

At operation 1202, a chain of actions leading to a compliance failure is identified using the logs. The chain of actions may be identified by (i) identifying a compliance failure using the requirement compliance reports, (ii) parsing the logs to identify actions contributing to conditions of the infrastructure component leading to the compliance failure, (iii) parsing the logs to identify other actions and conditions that were condition precedents for the actions contributing to the conditions of the infrastructure component leading to the compliance failure, and (iv) repeating the parsing for newly identified actions and conditions until a portion of actions are identified that have no condition precedents.

At operation 1204, potential actions for inclusion in an action set are identified based on the chain of actions. The potential actions may be identified by performing lookups or other processing based on the actions identified by the chain of actions leading to the compliance failure. The processing may return the potential actions. The potential actions may be any type of action that when performed (i) is likely to eliminate the compliance failure and/or (ii) is likely to reduce the likelihood of the compliance failure occurring again in the future.

For example, the potential actions may (i) eliminate conditions that are condition precedent for any of the actions in the chain thereby making it impossible for the actions to be performed while the condition precedents are unavailable, (ii) creating new conditions that prevent actions in the chain from being performed, (iii) reverse outcomes of any of the actions in the chain of actions, etc.

The method may end following operation 1204.

Actions for the actions set may be selected by adding any of the identified potential actions based on the CIA rankings. For example, actions from the potential actions may be added until an action set that is likely to adjust the CIA rankings to meet CIA ranking goals is obtained. The CIA ranking goals may be specified, for example, by an administrator, an automated process, and/or by other entities. Actions from the potential actions may be added to the action set based on other criteria without departing from embodiments disclosed herein.

In addition to obtaining actions sets, the potential actions and chain of actions may be used to convey information regarding management options for infrastructure components. For example, the potential actions and chain of actions may be presented to a user along. A user may select, in view of the chain of actions, any of the potential actions for performance.

When presented to the user, the relationships between the potential actions and the chain of actions may be presented. For example, performance of any potential action may impact any part of the chain of actions. In a graphical user interface, the relationship between each potential action and impacted portions of the chain of actions may be conveyed to the user such that the user may strategically select potential actions.

Additionally, while potential actions are presented to the user, information regarding the resource cost for performing the potential actions may also be presented to the user. Consequently, a user may be informed of resource cost for performing potential actions.

Figure 13:
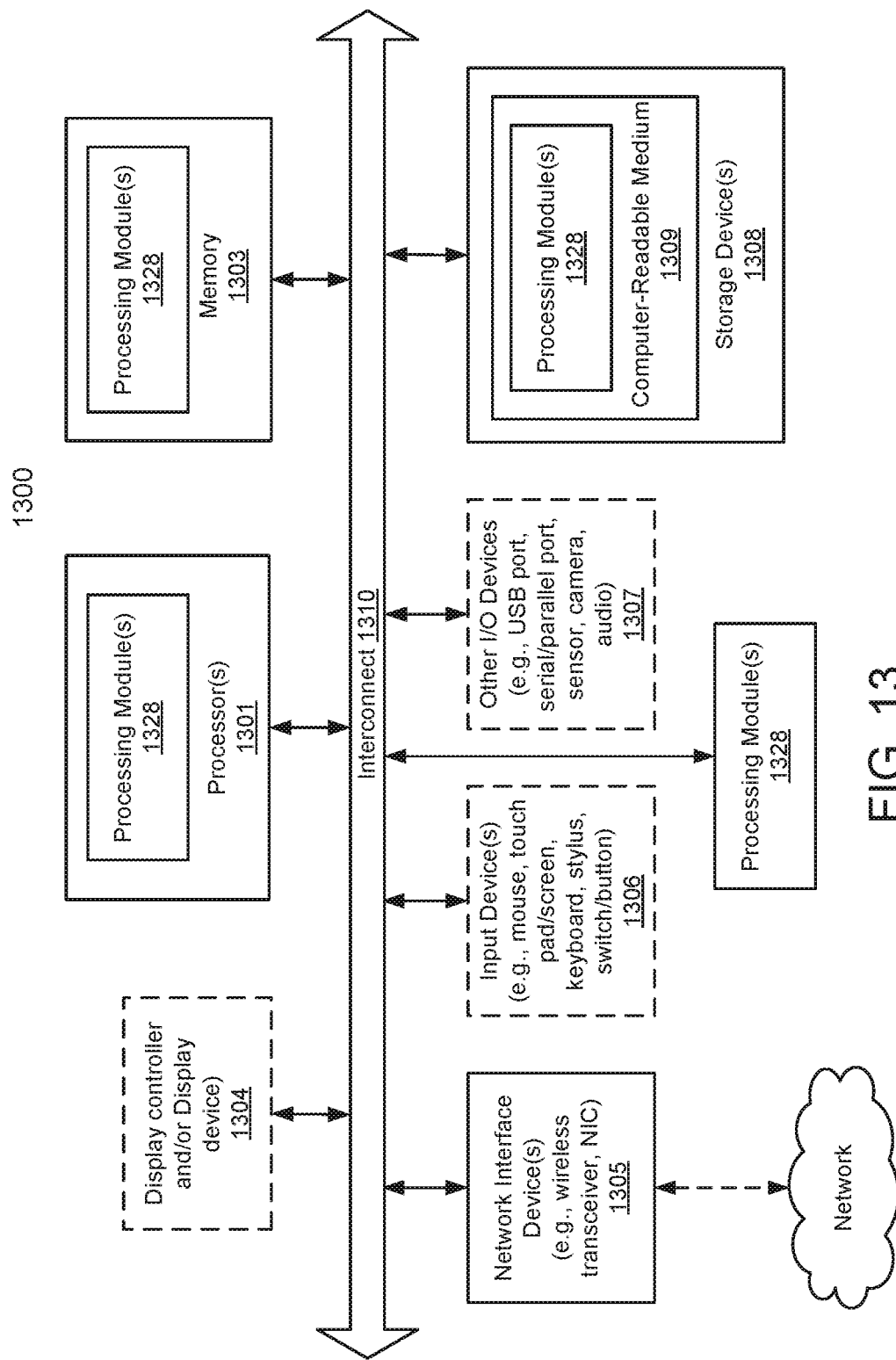
FIG. 13 shows a block diagram illustrating a data processing system in accordance with an embodiment.

Any of the components illustrated in FIGS. 1-2D, 5, 7-8B, and 10-11 may be implemented with one or more computing devices. Turning to FIG. 13, a block diagram illustrating an example of a data processing system (e.g., a computing device) in accordance with an embodiment is shown. For example, system 1300 may represent any of data processing systems described above performing any of the processes or methods described above. System 1300 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1300 is intended to show a high level view of many components of the computer system. However, it is to be understood that additional components may be present in certain implementations and furthermore, different arrangement of the components shown may occur in other implementations. System 1300 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1300 includes processor 1301, memory 1303, and devices 1305-1307 via a bus or an interconnect 1310. Processor 1301 may represent a single processor or multiple processors with a single processor core or multiple processor cores included therein. Processor 1301 may represent one or more general-purpose processors such as a microprocessor, a central processing unit (CPU), or the like. More particularly, processor 1301 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1301 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1301, which may be a low power multi-core processor socket such as an ultra-low voltage processor, may act as a main processing unit and central hub for communication with the various components of the system. Such processor can be implemented as a system on chip (SoC). Processor 1301 is configured to execute instructions for performing the operations discussed herein. System 1300 may further include a graphics interface that communicates with optional graphics subsystem 1304, which may include a display controller, a graphics processor, and/or a display device.

Processor 1301 may communicate with memory 1303, which in one embodiment can be implemented via multiple memory devices to provide for a given amount of system memory. Memory 1303 may include one or more volatile storage (or memory) devices such as random access memory (RAM), dynamic RAM (DRAM), synchronous DRAM (SDRAM), static RAM (SRAM), or other types of storage devices. Memory 1303 may store information including sequences of instructions that are executed by processor 1301, or any other device. For example, executable code and/or data of a variety of operating systems, device drivers, firmware (e.g., input output basic system or BIOS), and/or applications can be loaded in memory 1303 and executed by processor 1301. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1300 may further include IO devices such as devices (e.g., 1305, 1306, 1307, 1308) including network interface device(s) 1305, optional input device(s) 1306, and other optional IO device(s) 1307. Network interface device(s) 1305 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1306 may include a mouse, a touch pad, a touch sensitive screen (which may be integrated with a display device of optional graphics subsystem 1304), a pointer device such as a stylus, and/or a keyboard (e.g., physical keyboard or a virtual keyboard displayed as part of a touch sensitive screen). For example, input device(s) 1306 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1307 may include an audio device. An audio device may include a speaker and/or a microphone to facilitate voice-enabled functions, such as voice recognition, voice replication, digital recording, and/or telephony functions. Other IO devices 1307 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 1307 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1310 via a sensor hub (not shown), while other devices such as a keyboard or thermal sensor may be controlled by an embedded controller (not shown), dependent upon the specific configuration or design of system 1300.

To provide for persistent storage of information such as data, applications, one or more operating systems and so forth, a mass storage (not shown) may also couple to processor 1301. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1301, e.g., via a serial peripheral interface (SPI). This flash device may provide for non-volatile storage of system software, including a basic input/output software (BIOS) as well as other firmware of the system.

Storage device 1308 may include computer-readable storage medium 1309 (also known as a machine-readable storage medium or a computer-readable medium) on which is stored one or more sets of instructions or software (e.g., processing module, unit, and/or processing module/unit/logic 1328) embodying any one or more of the methodologies or functions described herein. Processing module/unit/logic 1328 may represent any of the components described above. Processing module/unit/logic 1328 may also reside, completely or at least partially, within memory 1303 and/or within processor 1301 during execution thereof by system 1300, memory 1303 and processor 1301 also constituting machine-accessible storage media. Processing module/unit/logic 1328 may further be transmitted or received over a network via network interface device(s) 1305.

Computer-readable storage medium 1309 may also be used to store some software functionalities described above persistently. While computer-readable storage medium 1309 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 1328, components and other features described herein can be implemented as discrete hardware components or integrated in the functionality of hardware components such as ASICS, FPGAs, DSPs or similar devices. In addition, processing module/unit/logic 1328 can be implemented as firmware or functional circuitry within hardware devices. Further, processing module/unit/logic 1328 can be implemented in any combination hardware devices and software components.

Note that while system 1300 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing computing infrastructure, the method comprising:
    obtaining a compliance information element for an infrastructure component of the computing infrastructure;
    dynamically processing the compliance information element to update a cross-standard compliance coverage model to obtain an updated cross-standard compliance coverage model;
    obtaining, using the updated cross-standard compliance coverage model, standard compliance data for a security standard enforced on the infrastructure;
    making a determination, based on the standard compliance data obtained using the updated cross-standard compliance coverage model, a confidentiality-integrity-availability classifications for the infrastructure, and a rating system, whether the infrastructure has undergone a change in compliance with the security standard; and
    in an instance of the determination made based on the standard compliance data obtained using the updated cross-standard compliance coverage model where the infrastructure has undergone a change in compliance with the security standard resulting in a compliance failure specified by the standard compliance data:
        obtaining logs for the infrastructure component;
        identifying a chain of actions that lead to the compliance failure and that caused the change in compliance with the security standard; and
        performing an action set to manage an impact of the change in compliance with the security standard, the action set being based at least in part of the chain of actions that was identified.

2. The method of claim 1, wherein the logs specify actions performed by the infrastructure over a period of time, one of the actions causing the compliance failure.

3. The method of claim 2, wherein identifying the chain of actions comprises:
    performing first parsing of the logs to identify a first action that modified operation of the infrastructure component, the operation of the infrastructure being governed by a portion of the security standard that the compliance failures indicates that the infrastructure component fails to meet.

4. The method of claim 3, wherein identifying the chain of actions further comprises:
    performing second parsing of the logs to identify a second action on which the first action depends.

5. The method of claim 4, wherein identifying the chain of actions further comprises:
    performing third parsing of the logs to identify a configuration of the infrastructure component on which the first action depends.

6. The method of claim 5, wherein identifying the chain of actions further comprises:
    performing fourth parsing of the logs to identify a third action through which the configuration of the infrastructure component was modified to allow the first action to be performed.

7. The method of claim 6, further comprising:
    identifying a potential action based on one or more of the first action, the second action, and the third action; and
    adding the potential action to the action set.

8. The method of claim 7, wherein the potential action breaks the chain of actions that was identified from being repeated.

9. A non-transitory machine-readable medium having instructions stored therein, which when executed by a processor, cause the processor to perform operations for managing computing infrastructure, the operations comprising:
    obtaining a compliance information element for an infrastructure component of the computing infrastructure;
    dynamically processing the compliance information element to update a cross-standard compliance coverage model to obtain an updated cross-standard compliance coverage model;
    obtaining, using the updated cross-standard compliance coverage model, standard compliance data for a security standard enforced on the infrastructure;
    making a determination, based on the standard compliance data obtained using the updated cross-standard compliance coverage model, a confidentiality-integrity-availability classifications for the infrastructure, and a rating system, whether the infrastructure has undergone a change in compliance with the security standard; and in an instance of the determination made based on the standard compliance data obtained using the updated cross-standard compliance coverage model where the infrastructure has undergone a change in compliance with the security standard resulting in a compliance failure specified by the standard compliance data:
obtaining logs for the infrastructure component;
identifying a chain of actions that lead to the compliance failure and that caused the change in compliance with the security standard; and
performing an action set to manage an impact of the change in compliance with the security standard, the action set being based at least in part of the chain of actions that was identified.

10. The non-transitory machine-readable medium of claim 9, wherein the logs specify actions performed by the infrastructure over a period of time, one of the actions causing the compliance failure.

11. The non-transitory machine-readable medium of claim 10, wherein identifying the chain of actions comprises:
performing first parsing of the logs to identify a first action that modified operation of the infrastructure component, the operation of the infrastructure being governed by a portion of the security standard that the compliance failures indicates that the infrastructure component fails to meet.

12. The non-transitory machine-readable medium of claim 11, wherein identifying the chain of actions further comprises:
performing second parsing of the logs to identify a second action on which the first action depends.

13. The non-transitory machine-readable medium of claim 12, wherein identifying the chain of actions further comprises:
performing third parsing of the logs to identify a configuration of the infrastructure component on which the first action depends.

14. The non-transitory machine-readable medium of claim 13, wherein identifying the chain of actions further comprises:
performing fourth parsing of the logs to identify a third action through which the configuration of the infrastructure component was modified to allow the first action to be performed.

15. The non-transitory machine-readable medium of claim 14, wherein the operations further comprise:
identifying a potential action based on one or more of the first action, the second action, and the third action; and
adding the potential action to the action set.

16. The non-transitory machine-readable medium of claim 15, wherein the potential action breaks the chain of actions that was identified from being repeated.

17. A data processing system, comprising:
a processor; and
a memory coupled to the processor to store instructions, which when executed by the processor, cause the processor to perform operations for managing computing infrastructure, the operations comprising:
obtaining a compliance information element for an infrastructure component of the computing infrastructure;
dynamically processing the compliance information element to update a cross-standard compliance coverage model to obtain an updated cross-standard compliance coverage model;
obtaining, using the updated cross-standard compliance coverage model, standard compliance data for a security standard enforced on the infrastructure;
making a determination, based on the standard compliance data obtained using the updated cross-standard compliance coverage model, a confidentiality-integrity-availability classifications for the infrastructure, and a rating system, whether the infrastructure has undergone a change in compliance with the security standard; and
in an instance of the determination made based on the standard compliance data obtained using the updated cross-standard compliance coverage model where the infrastructure has undergone a change in compliance with the security standard resulting in a compliance failure specified by the standard compliance data:
obtaining logs for the infrastructure component;
identifying a chain of actions that lead to the compliance failure and that caused the change in compliance with the security standard; and
performing an action set to manage an impact of the change in compliance with the security standard, the action set being based at least in part of the chain of actions that was identified.

18. The data processing system of claim 17, wherein the logs specify actions performed by the infrastructure over a period of time, one of the actions causing the compliance failure.

19. The data processing system of claim 18, wherein identifying the chain of actions comprises:
performing first parsing of the logs to identify a first action that modified operation of the infrastructure component, the operation of the infrastructure being governed by a portion of the security standard that the compliance failures indicates that the infrastructure component fails to meet.

20. The data processing system of claim 19, wherein identifying the chain of actions further comprises:
performing second parsing of the logs to identify a second action on which the first action depends.

* * * * *

UNITED STATES PATENT AND TRADEMARK OFFICE
CERTIFICATE OF CORRECTION

| | | |
|---|---|---|
| PATENT NO. | : 12,323,448 B2 | Page 1 of 1 |
| APPLICATION NO. | : 18/304796 | |
| DATED | : June 3, 2025 | |
| INVENTOR(S) | : Stav Sapir and Maxim Balin | |

It is certified that error appears in the above-identified patent and that said Letters Patent is hereby corrected as shown below:

In the Claims

Claim 1, Column 26, Line 8: The word "lead" should instead be -- led --.

Claim 3, Column 26, Line 24: The word "indicates" should instead be -- indicate --.

Claim 9, Column 27, Line 8: The word "lead" should instead be -- led --.

Claim 11, Column 27, Line 27: The word "indicates" should instead be -- indicate --.

Claim 19, Column 28, Line 48: The word "indicates" should instead be -- indicate --.

Signed and Sealed this
Seventh Day of October, 2025

John A. Squires
*Director of the United States Patent and Trademark Office*